United States Patent
Denoual et al.

(10) Patent No.: US 12,081,846 B2
(45) Date of Patent: Sep. 3, 2024

(54) METHOD, DEVICE, AND COMPUTER PROGRAM FOR IMPROVING ENCAPSULATION OF MEDIA CONTENT

(71) Applicant: CANON KABUSHIKI KAISHA, Tokyo (JP)

(72) Inventors: Franck Denoual, Saint Domineuc (FR); Naël Ouedraogo, Val D'Anast (FR); Eric Nassor, Thorigne-Fouillard (FR); Frédéric Maze, Langan (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 17/785,851

(22) PCT Filed: Dec. 16, 2020

(86) PCT No.: PCT/EP2020/086580
§ 371 (c)(1),
(2) Date: Jun. 15, 2022

(87) PCT Pub. No.: WO2021/122850
PCT Pub. Date: Jun. 24, 2021

(65) Prior Publication Data
US 2023/0025332 A1 Jan. 26, 2023

(30) Foreign Application Priority Data
Dec. 17, 2019 (GB) ..................... 1918667

(51) Int. Cl.
*H04N 21/845* (2011.01)
*H04N 19/46* (2014.01)
(Continued)

(52) U.S. Cl.
CPC ..... *H04N 21/85406* (2013.01); *H04N 21/234* (2013.01); *H04N 21/44* (2013.01);
(Continued)

(58) Field of Classification Search
CPC .......... H04N 21/85406; H04N 21/234; H04N 21/44; H04N 21/816; H04N 21/84;
(Continued)

(56) References Cited

U.S. PATENT DOCUMENTS

| 10,645,428 B2 * | 5/2020 | Denoual ............ H04N 21/4728 |
| 2016/0105690 A1 | 4/2016 | Denoual et al. |

(Continued)

FOREIGN PATENT DOCUMENTS

| CN | 106664446 A | 5/2017 |
| GB | 2512880 A | 10/2014 |
| GB | 2522014 A | 7/2015 |

OTHER PUBLICATIONS

Yong He, et al., On VVC tile design, Joint Video Experts team (JVET) of ITU-T SG 16 WP 3 and ISO/IEC JTC 1/SC 29/WG 11, 12th Meeting; Macao, CN, Oct. 3-12, 2018, Doc. No. JVET-L0127.

*Primary Examiner* — Farzana Hossain
(74) *Attorney, Agent, or Firm* — Canon U.S.A., Inc. IP Division

(57) ABSTRACT

According to embodiments, the invention provides a method for encapsulating partitioned timed media data comprising timed samples, comprising in turn subsamples, the timed samples being grouped into groups, the method comprising: obtaining spatial tracks, each spatial track comprising at least one subsample of a first timed sample and one corresponding subsample of the other timed samples, the corresponding subsamples being located at the same spatial position in its own timed sample as the at least one subsample; creating a base track referencing at least some of the spatial tracks, the base track comprising reconstruction instructions, each of the reconstruction instructions being associated with a group of timed samples, enabling generating a portion of a bit-stream from subsamples of spatial (Continued)

tracks, that belong to a same group of timed samples; and independently encapsulating each of the tracks in a least one media file.

18 Claims, 9 Drawing Sheets

(51) Int. Cl.
    *H04N 21/234*     (2011.01)
    *H04N 21/435*     (2011.01)
    *H04N 21/44*     (2011.01)
    *H04N 21/4402*     (2011.01)
    *H04N 21/4728*     (2011.01)
    *H04N 21/81*     (2011.01)
    *H04N 21/84*     (2011.01)
    *H04N 21/854*     (2011.01)

(52) U.S. Cl.
    CPC ........... *H04N 21/816* (2013.01); *H04N 21/84* (2013.01); *H04N 21/845* (2013.01)

(58) Field of Classification Search
    CPC .... H04N 21/845; H04N 19/46; H04N 21/235; H04N 21/435; H04N 21/4728; H04N 19/146; H04N 21/23; H04N 21/4402; H04N 21/81; H04N 21/854
    See application file for complete search history.

(56) References Cited

U.S. PATENT DOCUMENTS

| | | |
|---|---|---|
| 2016/0163355 A1 | 6/2016 | Hirabayashi et al. |
| 2017/0134829 A1 | 5/2017 | Maze |
| 2017/0223083 A1 | 8/2017 | Maze et al. |
| 2018/0199042 A1 | 7/2018 | Wang et al. |

* cited by examiner

METHOD, DEVICE, AND COMPUTER PROGRAM FOR IMPROVING ENCAPSULATION OF MEDIA CONTENT

CROSS REFERENCE TO RELATED APPLICATION

This application is the National Phase application of PCT Application No. PCT/EP2020/086580, filed on Dec. 16, 2020. This application claims the benefit under 35 U.S.C. § 119(a)-(d) of United Kingdom Patent Application No. 1918667.5, filed on Dec. 17, 2019. The above cited patent applications are incorporated herein by reference in their entirety.

FIELD OF THE INVENTION

The present invention relates to a method, a device, and a computer program for improving encapsulating and parsing of media data, making it possible to optimize transmission of portions of encapsulated media content.

BACKGROUND OF THE INVENTION

The invention relates to encapsulating, parsing, and streaming media content, e.g. according to ISO Base Media File Format as defined by the MPEG standardization organization, to provide a flexible and extensible format that facilitates interchange, management, editing, and presentation of group of media content and to improve its delivery for example over an IP network such as the Internet using adaptive http streaming protocol.

The International Standard Organization Base Media File Format (ISO BMFF, ISO/IEC 14496-12) is a well-known flexible and extensible format that describes encoded timed media data bit-streams either for local storage or transmission via a network or via another bit-stream delivery mechanism. This file format has several extensions, e.g. Part-15, ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), or L-HEVC (Layered HEVC). This file format is object-oriented. It is composed of building blocks called boxes (or data structures, each of which being identified by a four character code) that are sequentially or hierarchically organized and that define descriptive parameters of the encoded timed media data bit-stream such as timing and structure parameters. In the file format, the overall presentation over time is called a movie. The movie is described by a movie box (with four character code 'moov') at the top level of the media or presentation file. This movie box represents an initialization information container containing a set of various boxes describing the presentation. It may be logically divided into tracks represented by track boxes (with four character code 'trak'). Each track (uniquely identified by a track identifier (track_ID)) represents a timed sequence of media data pertaining to the presentation (frames of video, for example). Within each track, each timed unit of data is called a sample; this might be a frame of video, audio or timed metadata. Samples are implicitly numbered in sequence. The actual samples data are in boxes called Media Data Boxes (with four character code 'mdat') at the same level as the movie box. The movie may also be fragmented, i.e. organized temporally as a movie box containing information for the whole presentation followed by a list of movie fragment and Media Data box pairs. Within a movie fragment (box with four-character code 'moof') there is a set of track fragments (box with four character code 'traf'), zero or more per movie fragment. The track fragments in turn contain zero or more track run boxes ('trun'), each of which documents a contiguous run of samples for that track fragment.

Media data encapsulated with ISOBMFF can be used for adaptive streaming with HTTP. For example, MPEG DASH (for "Dynamic Adaptive Streaming over HTTP") and Smooth Streaming are HTTP adaptive streaming protocols enabling segment or fragment based delivery of media files. The MPEG DASH standard (see "ISO/IEC 23009-1, Dynamic adaptive streaming over HTTP (DASH), Part 1: Media presentation description and segment formats") makes it possible to establish a link between a compact description of the content(s) of a media presentation and the HTTP addresses. Usually, this association is described in a file called a manifest file or description file. In the context of DASH, this manifest file is a file also called the MPD file (for Media Presentation Description). When a client device gets the MPD file, the description of each encoded and deliverable version of media content can easily be determined by the client. By reading or parsing the manifest file, the client is aware of the kind of media content components proposed in the media presentation and is aware of the HTTP addresses for downloading the associated media content components. Therefore, it can decide which media content components to download (via HTTP requests) and to play (decoding and playing after reception of the media data segments). DASH defines several types of segments, mainly initialization segments, media segments, or index segments. Initialization segments contain setup information and metadata describing the media content, typically at least the 'ftyp' and 'moov' boxes of an ISOBMFF media file. A media segment contains the media data. It can be for example one or more 'moot' plus 'mdat' boxes of an ISOBMFF file or a byte range in the 'mdat' box of an ISOBMFF file. A media segment may be further subdivided into sub-segments (also corresponding to one or more complete 'moot' plus 'mdat' boxes). The DASH manifest may provide segment URLs or a base URL to the file with byte ranges to segments for a streaming client to address these segments through HTTP requests. The byte range information may be provided by index segments or by specific ISOBMFF boxes such as the Segment Index Box 'sidx' or the SubSegment Index Box 'ssix'.

FIG. 1 illustrates an example of streaming media data from a server to a client.

As illustrated, a server 100 comprises an encapsulation module 105 connected, via a network interface (not represented), to a communication network 110 to which is also connected, via a network interface (not represented), a de-encapsulation module 115 of a client 120.

Server 100 processes data, e.g. video and/or audio data, for streaming or for storage. To that end, server 100 obtains or receives data comprising, for example, the recording of a scene by one or more cameras, referred to as a source video. The source video is received by the server as an original sequence of pictures 125. The server encodes the sequence of pictures into media data (i.e. bit-stream) using a media encoder (e.g. video encoder), not represented, and encapsulates the media data in one or more media files or media segments 130 using encapsulation module 105. Encapsulation module 105 comprises at least one of a writer or a packager to encapsulate the media data. The media encoder may be implemented within encapsulation module 105 to encode received data or may be separate from encapsulation module 105.

Client 120 is used for processing data received from communication network 110, for example for processing media file 130. After the received data have been de-encapsulated in de-encapsulation module 115 (also known as a parser), the de-encapsulated data (or parsed data), corresponding to a media data bit-stream, are decoded, forming, for example, audio and/or video data that may be stored, displayed or output. The media decoder may be implemented within de-encapsulation module 115 or it may be separate from de-encapsulation module 115. The media decoder may be configured to decode one or more video bit-streams in parallel.

It is noted that media file 130 may be communicated to de-encapsulation module 115 into different ways. In particular, encapsulation module 105 may generate media file 130 with a media description (e.g. DASH MPD) and communicates (or streams) it directly to de-encapsulation module 115 upon receiving a request from client 120.

For the sake of illustration, media file 130 may encapsulate media data (e.g. encoded audio or video) into boxes according to ISO Base Media File Format (ISOBMFF, ISO/IEC 14496-12 and ISO/IEC 14496-15 standards). In such a case, media file 130 may correspond to one or more media files (indicated by a FileTypeBox 'ftyp') or one or more segment files (indicated by a SegmentTypeBox 'styp'). According to ISOBMFF, media file 130 may include two kinds of boxes, a "media data box", identified as 'mdat', containing the media data and "metadata boxes" (e.g. 'moot' containing metadata defining placement and timing of the media data. In a preferred embodiment, the sequence of pictures 125 is encoded, or compressed, according to the Versatile Video Codec specification ISO/IEC 23090-3.

While solutions based on these mechanisms have proven their effectiveness, there is a constant need to improve such mechanisms, in particular to increase their adaptability to new usages and to new devices.

The present invention has been devised to address one or more of the foregoing concerns.

SUMMARY OF THE INVENTION

According to a first aspect of the invention there is provided a method for encapsulating partitioned video data (or partitioned timed media data) in a server, the partitioned video data comprising a plurality of frames (or timed samples), each frame comprising a plurality of partitions (or subsamples), the frames being grouped into a plurality of groups, the method comprising:
  obtaining a plurality of spatial tracks, each spatial track comprising at least one partition of a first frame and one corresponding partition of each of the frames of the plurality of frames different from the first frame, each of the corresponding partitions being located at the same spatial position in its own frame as the at least one partition in the first frame;
  creating a base track referencing at least some of the spatial tracks, the base track comprising a plurality of reconstruction instructions, each of the reconstruction instructions being associated with a group of frames and each of the reconstruction instructions enabling generating a portion of a bit-stream from partitions of spatial tracks, that belong to a same group of frames; and
  encapsulating each of the tracks in a least one media file.

Accordingly, the method of the invention makes it possible to use a low description overhead, described in the metadata part (i.e. not mixed with video data), while bringing some flexibility enabling dynamic change of track references, for example to provide reconstruction rules.

According to some embodiments, each of the reconstruction instructions corresponds to an ordered list of spatial track references.

According to some embodiments, the reconstruction instructions belong to the metadata part of the base track.

According to some embodiments, the method further comprises generating the plurality of spatial tracks.

According to some embodiments, generating the plurality of spatial tracks comprises:
  selecting partitions from amongst the plurality of partitions of one of the frames; and
  for each of the selected partitions, creating one spatial track comprising the selected partition and corresponding partitions being located at the same spatial position in its own frame as the selected partition.

According to some embodiments, the method further comprises determining a layout of partitions within a frame.

According to some embodiments, the method further comprises determining an encapsulation layout, the plurality of spatial tracks being generated as a function of the encapsulation layout.

According to a second aspect of the invention there is provided a method for generating a bit-stream from encapsulated partitioned video data, in a client device, the partitioned video data comprising a plurality of frames, each frame comprising a plurality of partitions, the frames being grouped into a plurality of groups, the method comprising:
  obtaining at least one media file comprising at least one base track and a plurality of spatial tracks,
    each spatial track comprising at least one partition of a first frame and one corresponding partition of each of the frames of the plurality of frames different from the first frame, each of the corresponding partitions being located at the same spatial position in its own frame as the at least one partition in the first frame;
    the base track referencing at least some of the spatial tracks, the base track comprising a plurality of reconstruction instructions, each of the reconstruction instructions being associated with a group of frames and each of the reconstruction instructions enabling generating a portion of a bit-stream from partitions of spatial tracks, that belong to a same group of frames;
  for each of the plurality of groups of frames, generating a portion of a bit-stream according to reconstruction instructions associated with each of the plurality of groups of frames.

Accordingly, the method of the invention makes it possible to use a low description overhead, described in the metadata part (i.e. not mixed with video data), while bringing some flexibility enabling dynamic change of track references, for example to provide reconstruction rules.

According to some embodiments, the method further comprises obtaining media data from spatial tracks and concatenating the obtained media data according to an order defined by reconstruction instructions.

According to some embodiments, the method further comprises obtaining metadata and concatenating the obtained metadata with the media data.

According to some embodiments, the metadata are obtained from the base track or from an additional track.

According to some embodiments, the reconstruction instructions comprise an ordered list of references to spatial tracks.

According to some embodiments, reconstruction instructions associated with a group of frames make it possible to modify reconstruction instructions associated with another group of frames.

According to some embodiments, the portions of bitstream conforms the MPEG Versatile Video Coding standard.

According to other aspects of the invention there is provided a device comprising a processing unit configured for carrying out each of the steps of the method described above. This device provides advantages that are similar to those provided by the method described above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
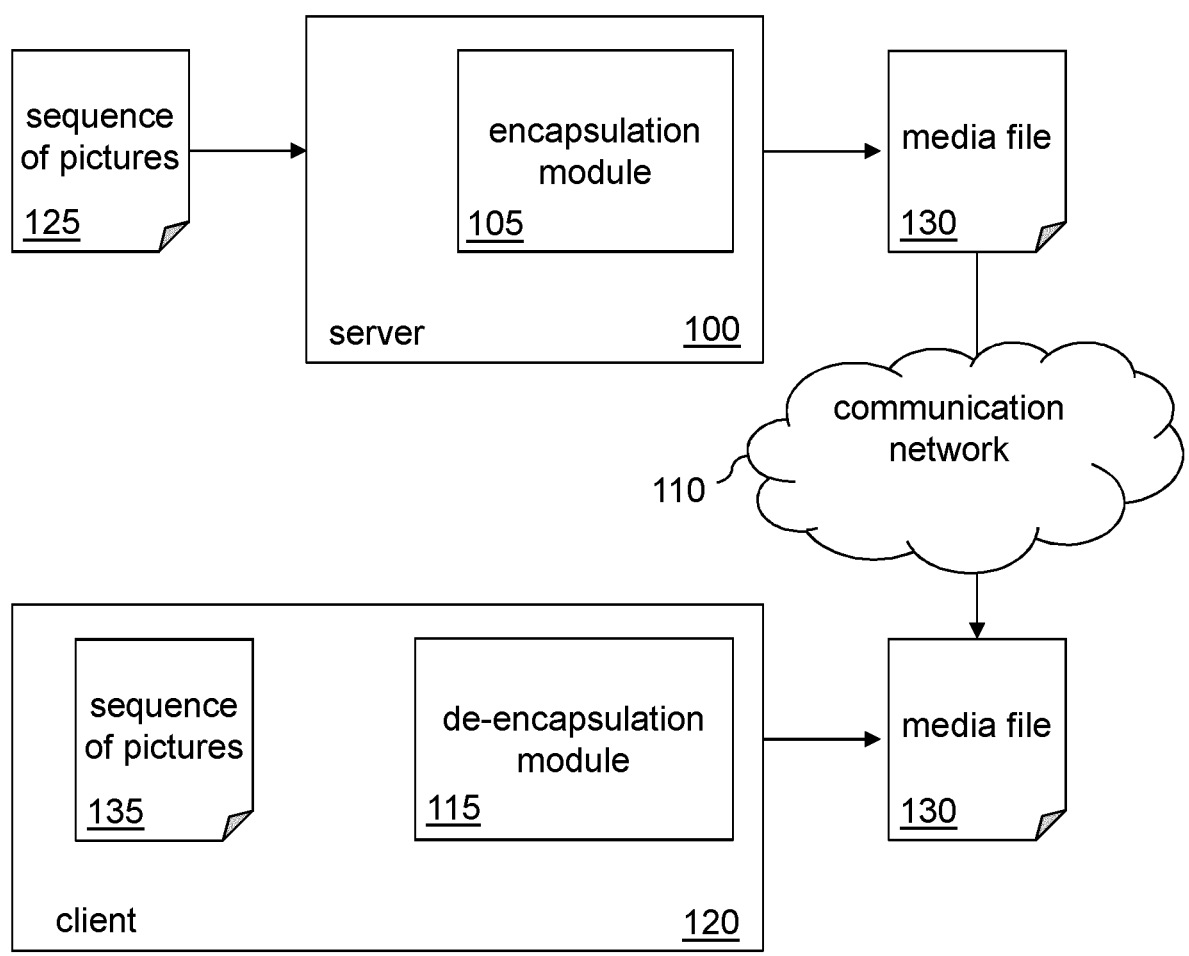
FIG. 1 illustrates an example of streaming media data from a server to a client.

According to some embodiments, the invention makes it possible to associate different reconstruction instructions to different groups of timed samples of partitioned timed media data, for example to different groups of pictures, so that portions of timed samples can be reconstructed from different tracks coding the media data.

In particular, some embodiments of the invention take advantage of slices, tiles, or subpictures of encoded videos for adaptive streaming over HTTP, giving the possibility to clients to select and compose spatial parts of videos to obtain and render a video given the client context (for example in terms of available bandwidth and client processing capabilities). This is obtained by giving the possibility to a client to access selected metadata independently of the associated actual data (or payload).

For the sake of illustration, many embodiments described herein below are based on the MPEG Versatile Video Coding (VVC) standard or extensions thereof. However, embodiments of the invention also apply to other coding standards.

It is noted that according to the VVC standard, a video bit-stream may be encoded using partitions such as slices, tiles, and/or subpictures enabling spatial accesses into the compressed video. Such partitions are accessible as network abstraction layer (NAL) units (NALU) corresponding either to compressed video data, referred to as video coding layer (VCL) NALU, that may be media data of a slice, or to descriptive parameters, referred to as non-VCL NALU, that may be parameter sets or picture headers.

It is recalled here that a tile may be defined as a rectangular region of coding tree units (CTUs) within a particular tile column and a particular tile row in a picture, a slice may be defined as an integer number of complete tiles or an integer number of consecutive complete CTU rows within a tile of a picture that are exclusively contained in a single NAL unit, and a subpicture may be defined as a rectangular region of one or more slices within a picture.

Whatever the partition (presence of tiles or subpictures), VVC standard specifies constraints on the NALU order that should be provided to a decoder.

To cope with such a NALU order, encapsulation and packaging layer according to ISO/IEC 14496 parts 12 and 15 provide tools to reconstruct a track from one or more tracks containing media data. Mechanisms for reconstructing a full picture from a set of tile tracks may be found in part 15. They use extractors or implicit reconstruction. When using extractors, a reconstruction rule is provided on a sample basis. This induces a description overhead, several bytes per sample. Moreover, it complexifies the parsing process because these instructions are specific NAL units mixed with the data corresponding to the compressed video. When using implicit reconstruction, a track reference may provide track relationships with specific type indicating a reconstruction order at track level that should apply to all samples of the track.

Some embodiments of the invention make it possible to use a low description overhead, described in the metadata part (i.e. not mixed with video data), while bringing some flexibility enabling dynamic change of track references, for example to provide reconstruction rules. This enables new use cases like the extraction of a tracked object (or dynamic region of interest (ROI)) in compressed videos. Such embodiments can be viewed as a generic tool that allows:
reconstruction of a full video;
extraction of one or more parts (or regions) from the considered compressed video, that spatial location may vary in the video;
composition of different compressed videos;
spatial rearrangement of compressed videos; and
handling live video.

Figure 2:
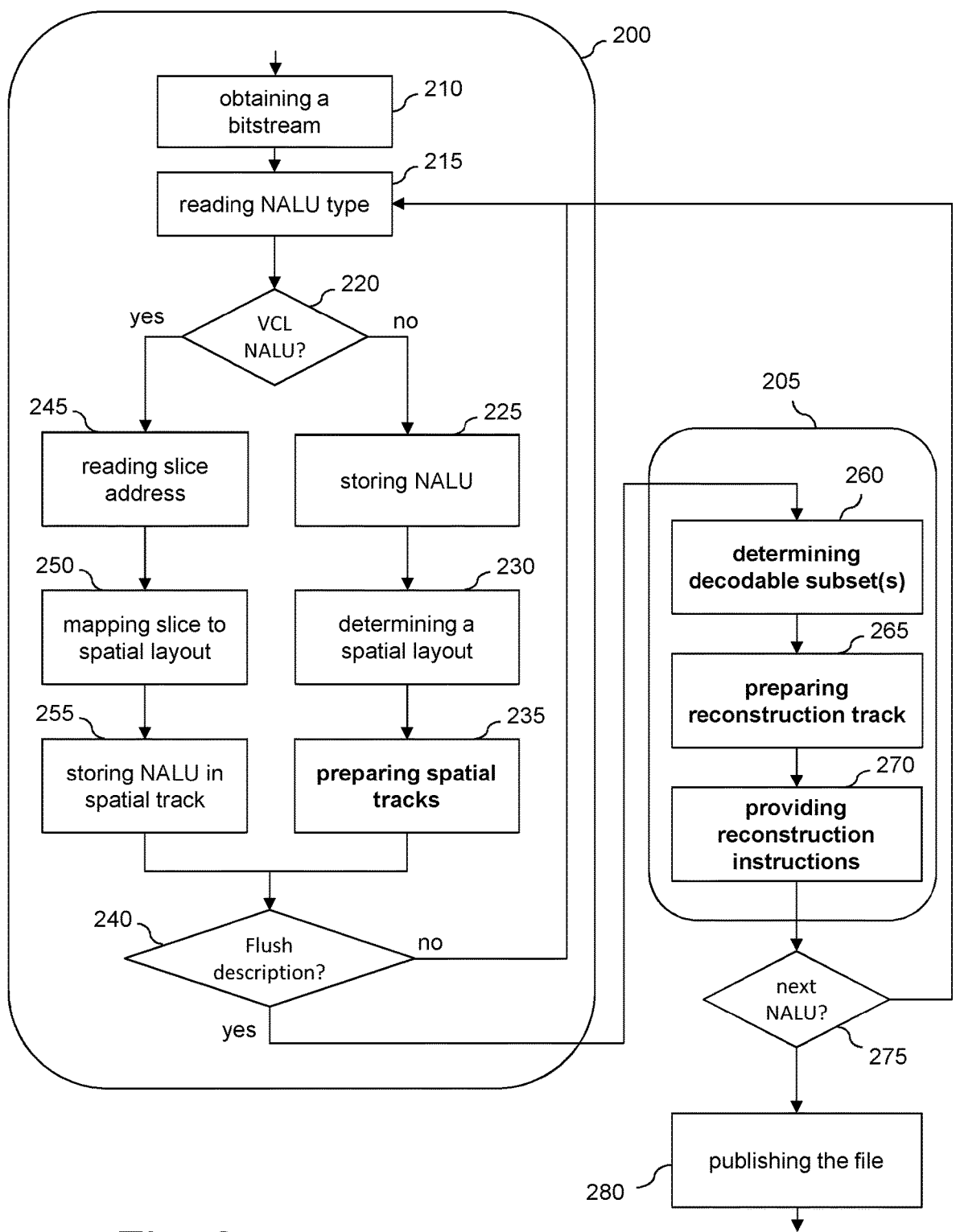
FIG. 2 illustrates an example of steps of an encapsulation process carried out in a server, according to some embodiments of the invention.

FIG. 2 illustrates an example of steps of an encapsulation process carried out in a server, for example server 100 in FIG. 1, according to some embodiments of the invention.

As illustrated, the steps can be grouped in two phases, a first phase 200 for preparing spatial tracks and a second phase 205 for generating a base track making it possible for a client to generate a bit-stream conforming the VVC standard (or any other predetermined format) from spatial tracks.

According to the illustrated example, a first step of the first phase (step 210) is directed to obtaining video data, for example as a compressed video bit-stream. Such a bit-stream may be read from a local storage medium or may be received through a communication network. It may be fully available or it may be generated on the fly. The bit-stream may be generated by the server carrying out the steps of FIG. 2 itself or may be generated in another device. In some embodiments, the obtained bit-stream conforms the Versatile Video Codec specification.

Then, an encapsulation module reads the first NAL unit (NALU) from the obtained bit-stream and a test is carried out to determine whether the read NALU is a NALU containing compressed video data, i.e. a Video Coding Layer NALU (or VCL NALU), or not (steps 215 and 220). Typically, the first NALU in the bit-stream may be a non-VCL NALU, corresponding to a parameter set (e.g. depth parameter set (DPS), video parameter set (VPS), or sequence parameter set (SPS)).

If the read NALU is a non VCL NALU, it is stored in a memory of the server (step 225). Next, depending on the type of the non VCL NALU, the encapsulation module may further inspect the NALU to look for picture partitioning information (step 230). For example, it may inspect a SPS to check for a declaration of a subpicture layout providing position and sizes and coding constraints for subpictures. It may also check in a PPS the presence of tiles and when present, their positions. From the PPS, it may also parse the part of the PPS providing the slice positions. Other non VCL NALU such as parameter sets corresponding to picture headers may be stored for later use.

As a result of the non VCL NALU analysis carried out in step 230, the encapsulation module determines the granularity for the VCL NALU storage, that it is to say the spatial layout of the encoded pictures. Indeed, the pictures encoded in the bit-stream may contain one or more slices, one or more tiles, and/or one or more subpictures. By inspecting the different parameter sets and in accordance with encapsulation configuration parameters (that may be hard-coded in the encapsulation module or specified by a user, for example via a graphical user interface or by a command line or a script), the encapsulation module determines a storage granularity, e.g. a storage organized as a function of slices, tiles, or subpictures. According to some embodiments, one or more spatial tracks are defined as a function of the storage granularity (step 235), each spatial track corresponding for example, to one or more slices, tiles, or subpictures. Spatial tracks are described in more detail hereafter.

After having processed the non VCL NALU, a test is carried out to determine whether another NALU is to be read (step 240). If another NALU is to be read, the encapsulation module reads it and loops to step 215 to read its type and processed it accordingly.

If the read NALU is a VCL NALU (step 220), for example a NALU defining a slice, the encapsulation module parses the slice address (step 245) to determine the position of the slice in the pictures of the compressed video. This information may be obtained from the slice header. When a non VCL NALU indicates that subpictures are present, the slice header may provide a subpicture identifier. This parameter may also be read by the encapsulation module during step 245. Determining the slice address allows the encapsulation module to map the slice to one of the spatial track prepared at step 235 (step 250).

Next, the slice header and the slice payload (i.e. the slice_data in the bit-stream) of the current VCL NALU are read and buffered to be stored later as a sample in the data part of the corresponding spatial track. Indeed, after having determined the spatial layout (step 230) and when building the list of spatial tracks (step 235), the encapsulation module stores in memory the spatial position of each spatial track into the determined spatial layout. The encapsulation module must then determine, from the read slice address determined at step 245, the position of the slice in the whole picture so as to assign it to the appropriate spatial track in step 255. The sample description of the appropriate spatial track is updated with sample size information, sample position in the data part of the file, decoding time, optionally with the composition time. When the media data are encapsulated into segments or into fragments, these items of information may be stored in a 'trun' box. Otherwise, they are stored in dedicated boxes (sub-boxes) for the sample description (e.g. the SampleTableBox 'stbl').

Steps 215 to 255 are repeated until the encapsulation module decides to flush tracks or sample description (step 240), corresponding to phase 205. This decision may correspond to a start of a new picture (e.g. when the encapsulation module identifies a non VCL NALU corresponding to a picture header) or to segmentation or fragmentation rules (e.g. the fragment or segment duration is reached). The fragment or segment duration is one encapsulation setting that may be set by a user, via a user interface, a commend line or scripts, or by pre-defined settings for the encapsulation module.

When the encapsulation module decides to flush some parts of the description, it prepares entry points as one or more specific tracks. An entry point may be a track that is a candidate for display. This may be indicated by setting flag values in the track header box, for example the track_in_movie flags. A first entry point can be a track allowing the reconstruction of the full video. Another entry point may be an extraction track making it possible to reconstruct only a spatial area or region of the full video. Another entry point may be a track providing a composition of parts from different videos.

Whatever the purpose of the entry point, the corresponding track is referred to as a base track. It should be understood that "base" is just an example name. Another name could be used such as a composition track, an extraction track, etc. Characteristics of such a base track are detailed hereafter.

Such entry points are determined and declared in an initialization step as a list of displayable tracks, each with a corresponding 'trak' box.

As illustrated, the encapsulation module determines, from collected control flags or from the encoder knowledge obtained during steps 225 to 235, the possible spatial or set of spatial tracks with VCL NAL units that can be independently decoded (step 260). For example, a spatial track describing independent subpictures is assumed to be an independently decodable track. Likewise, a spatial track storing tiles or set of tiles for which supplemental enhancement information (SEI) indicating that they are motion constrained, is assumed to be an independently decodable track. Still as an example, when a spatial track stores slices that are all intra coded, the encapsulation module may consider this spatial track as independently decodable.

From the bit-stream (for example from parameters sets or SEI) or from out-of-bands information, dependencies between slices, tiles, or subpictures may be determined and used during step 260 to collect a set of spatial tracks that lead to an independently decodable bit-stream when combined together.

Next, from the list of spatial tracks obtained in step 260, the encapsulation module provides information and references for each base track (step 265). More precisely, it provides, for each base track, the number of collected spatial tracks and a reference to these spatial tracks in the base track description. This can be done, for example, in a sample group describing reconstruction instructions. The use of such sample groups is described herein after. The encapsulation module may provide dependencies from a base track to other tracks than the spatial tracks, for example to tracks containing parameter sets. Another example is directed to base tracks corresponding to one layer or sub layer and depending on another base track to reconstruct the set of layers or sub-layers. These dependencies may be declared in a track reference box.

Next, depending on the kind of entry point, some parameter sets may need to be generated so that the VCL NAL units present in the collected spatial tracks lead to a bit-stream that would be decodable by any VVC decoder (or decoder corresponding to the predetermined format that is used). For the sake of illustration, when the entry point corresponds to a selected ROI, the picture sizes may be provided, as well as a profile, and level information. Some parts of the parameter sets are then rewritten by the encapsulation module or reused from initial ones, but no VCL NAL unit is rewritten.

Next, a sample group of the base track (corresponding to the encoded VCL NAL) is written with a list of referenced spatial tracks (step 270). This list of references shall provide the spatial tracks in an order that will guarantee that for each sample, the concatenation of the VCL NAL unit of each of these spatial tracks will produce a bit-stream conforming the used encoding format (e.g. VVC, HEVC, AVC, etc.).

Next, a test is carried out to check whether the end of the bit-stream is reached or not (step 275). If the end of the bit-stream is not reached, the following NALU is read (step 215) and processed according to steps 225 to 235 or to steps 245 to 255, depending on its type (determined at step 220). If the end of the bit-stream is reached, the process stops and the generated file(s) may be published to be accessible from a client device.

Figure 3:
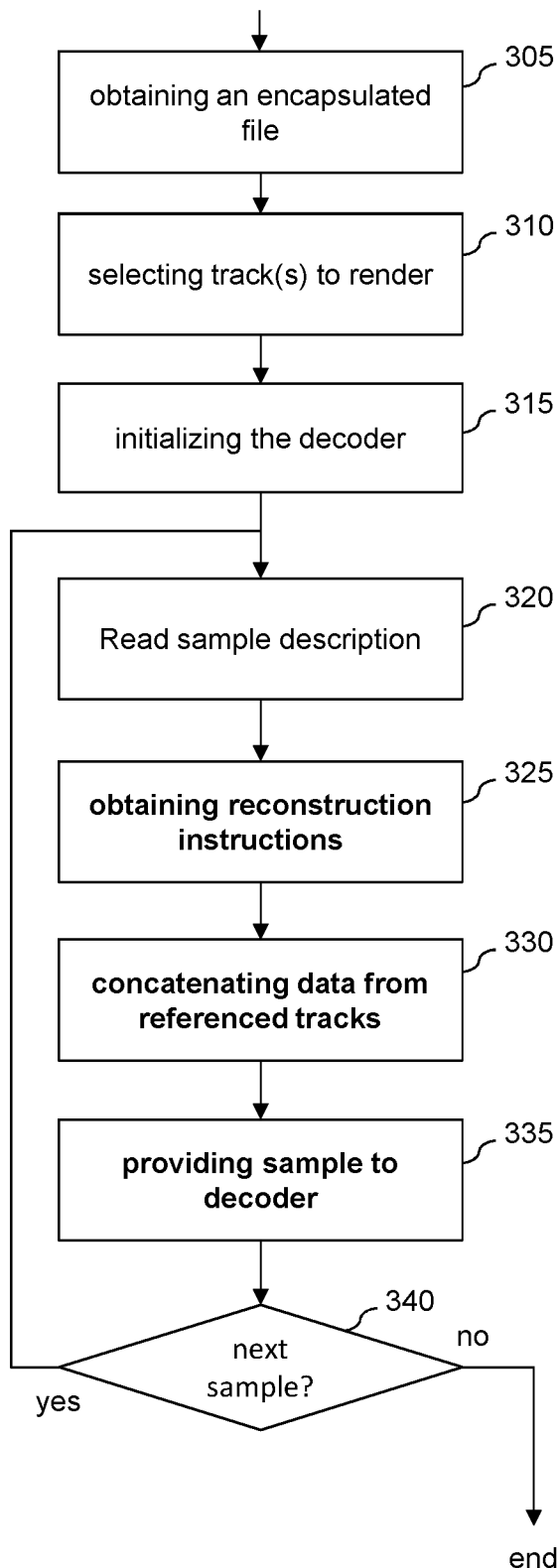
FIG. 3 illustrates an example of steps of a parsing process carried out in a client device, according to some embodiments of the invention.

FIG. 3 illustrates an example of steps of a parsing process carried out in a client device, according to some embodiments of the invention.

As illustrated, a first step carried out in a parser of the client device (hereafter the client) is directed to obtaining an encapsulated file (step 305). This file may be read from a local storage medium or obtained from a remote server through a communication network. It may be downloaded or streamed. The encapsulated file may be obtained as a file, a fragmented file, or as segment files.

From the high level metadata, for example from the track declaration, the parser identifies some tracks that are to be used for playback. This may be done by reading the values of the flags in the track header boxes present under the 'moov' box. The parser selects one or more of these tracks (step 310) and initializes the appropriate decoder (step 315), for example, the parser initializes a video decoder for a video track, chosen as a function of the encoding format. This may be done by reading, from the obtained encapsulated file, the decoder configuration information in the sample description of the selected one or more tracks (step 320).

Next, further to reading the sample description, the parser may detect a sample group providing reconstruction information (step 325). Such an item of information informs the parser that possibly the data to parse may come from different tracks and may involve concatenation of data in a given order before being provided to the decoder. Using reconstruction instructions from the sample group description, the parser reads a NAL unit from each of the referenced tracks, in the specified order. These NAL units are then concatenated (step 330) and provided to a decoder (step 335) that uses them to reconstruct the corresponding picture for rendering or displaying.

For example, a sample from a VVC track with dependencies to other tracks may be reconstructed as follows. First, the output sample is initialized to empty. Then, the parameter sets from the associated sample entry are inserted in the output sample and the data from the sample is inserted in the output bit-stream. For each of the referenced track and in the order of said references, if the referenced track is a spatial track, the sample in the referenced track with the same decoding time is fetched and its data inserted in the output bit-stream. If it has no sample for that decoding time, e.g. the referenced track has an empty sample at that decoding time, then no data is inserted. If the referenced track is a track describing and storing non VCL NALUs only, the sample in the referenced track with the same decoding time, or the sample immediately preceding the sample in decoding time and marked as a 'sync' sample, is fetched and its data inserted in the output bit-stream.

As illustrated (step 340), this process iterates until the last sample of the encapsulated file is reached.

Having the reconstruction instructions described with the expected order makes the parsing and reconstruction easier for the parser than when specific NAL units provide such instructions (by using, for example, Extractors).

Spatial Track

According to some embodiments, in particular to some embodiments directed to VVC, a spatial track represents a timed sequence of spatial parts of video frames, i.e. it mainly contains VCL NALUs. A spatial track is a track that will contain the VCL NAL units corresponding to the same spatial area in different coded pictures. A spatial track may not be played by itself. When a spatial track cannot be played by itself, it is "hidden" or described as not being a candidate for playback, in the encapsulated file, by setting an appropriate flag, for example in the track header box: the track_in_movie flag is not set.

The spatial area associated with a spatial track may correspond to a slice, to a group (or a set) of slices, to a tile, to a group (or a set) of tiles, to a subpicture, or to a group (or a set) of subpictures, depending on the access granularity selected for the encapsulation (that may be hard-coded or defined by a user as described above).

A spatial track may not be independently decodable. For example, when the access granularity is at subpicture level, the encapsulation module may find control flags, by inspecting the SPS, providing coding constraints for the subpictures. These control flags may be a single flag explicitly indicating the independent encoding feature of a subpicture or a set of flags providing information on the kind of encoding constraints that are present or not. As another example, when the access granularity corresponds to a tile or a group of tiles, knowledge about the encoder, especially when performed by the server itself, can help in determining the independently decodable criterion. For example, the server may encode videos with constraints on motion prediction so that each tile or group of tiles is self-contained, i.e. it has no dependencies to the tiles or groups of tiles that are not at the same position in the coded picture.

A spatial track may be described with the 'trak' box and its sub boxes. Track and sample description are generated by the encapsulation module so that the data for a spatial area at a given time can be easily retrieved from the data part of the file.

According to some embodiments, a sample of a spatial track contains the data of a source video corresponding to a given spatial area. Spatial tracks, depending on the access granularity, may have different sample entry types. For example, a sample entry type 'vvsl' (or any reserved four character code) may be used to indicate that a spatial track represents a timed sequenced of one or more slices, a sample entry type 'vvtl' (or any reserved four character code) may be used to indicate that a spatial track represents a timed sequenced of one or more tiles, and a sample entry type 'vvsp' (or any reserved four-character code) may be used to indicate a timed sequence of one or more subpictures.

As another example, a sample entry type 'vvcS' or 'vvcs' (or another four-character code reserved for this purpose and not conflicting with existing ones) only indicates that the track is a spatial track but does not provide the access granularity (slice, tile, or subpicture). For example, a 'vvcS' or 'vvcs' sample entry identifies a VVC track only used to store VCL NAL units, forming a rectangular area of slices, tiles, or subpictures. A track having a sample entry indicating that it is a spatial track (for example one of the mentioned example with or without indication of the access granularity), this sample entry type shall be the one and only sample entry for this track. In other words, a spatial track cannot mix different kinds of samples like samples for a picture region with samples for full video or samples from a given picture region with samples for another picture region. Unless indicated otherwise, other child boxes of video sample entries (clean aperture, pixel aspect ratio, etc.) should not be present in a 'vvcS' sample entry and should be ignored by parsers, these information being defined in a base track.

A sample in a VVC spatial track may be marked as a synchronization ('sync') sample when all the VCL NALUs it contains are intra coded slices only. It may be marked as a 'sync' sample when it corresponds to a subsample of a picture that was indicated as a random access point in the bit-stream. For example, the encapsulation module may determine whether a picture is a random access point by reading the NALU types of the VCL NALUs corresponding to a same picture or any indication in non VCL NALU informing on random access point. Composition time offset information for samples of a VVC spatial track shall not be present, this information being provided in a base track. This is not useful for not displayable tracks. Sample dependency type box and sample dependency flags for samples of a spatial track shall not be present because the sample description in a spatial track does not describe full VVC samples, hence all dependency information is not relevant here and is preferably stored in a base track. Subsample information for samples of a VVC spatial track may be present; if present, they shall follow the definition of sub samples for VVC sample entry type. A sample entry for a spatial track may provide configuration information to provide at least the length in bytes of the NALUnitLength field for the samples of this track to which this configuration record applies. This minimal configuration information can be described as follows:

```
class VvcNALUConfigurationBox extends Box('vvsC') {
    unsigned int(6) reserved=0;
    unsigned int(2) lengthSizeMinusOne;
}
```
and embedded in a VVC sample entry for VVC spatial track as follows:
```
class VvcSpatialStorageSampleEntry( ) extends VisualSampleEntry
('vvcS'){
    VvcNALUConfigurationBox   config;
}
``` where lengthSizeMinusOne plus 1 indicates the length in bytes of the NALUnitLength field in a VVC video sample in the stream to which this configuration record applies. For example, a size of one byte is indicated with a value of 0. The value of this field shall be one of 0, 1, or 3 corresponding to a length encoded with 1, 2, or 4 bytes, respectively.

Advantageously, splitting data into spatial tracks provides access to spatial parts along time in a simpler way than when the spatial parts are interleaved for each frame. Indeed, this allows media players, when the file is streamed, to request a temporal segment for a given spatial area in a single request with one byte range instead of one request with multiple byte ranges or of multiple requests.

A spatial track may be fragmented or segmented, for example when the video compression is done in live.

A spatial track may be encapsulated with a track description or a sample description providing an indication about the full video, e.g. a source identifier, it comes from and optionally its position in this full video. According to some embodiments, spatial tracks sharing the same source identifier are considered as coming from the same source video. An additional identifier may be written in the description of a spatial track to further indicate an original bit-stream from which the NALUs come from. This may be useful for use cases where picture regions from different bit-streams are merged or for use cases where picture regions are swapped, for example to change locally the quality. For such an additional identifier, all tracks having the same value for this additional identifier are considered as describing NALUs from the same bit-stream. It may be described as a groupListBox providing a list of entity groups, one group per bit-stream. A variant for the bit-stream identifier consists in defining group of tracks using the track group box either with a dedicated grouping type, or by reusing the 'msrc' grouping-type indicating that the spatial track belongs to a multi-source presentation, the multi-source being the multiple spatial tracks representing the same bit-stream and then the same source video.

Base Track

According to some embodiments, a base track defines an entry point in an encapsulated file. For the sake of example, a base track may be signaled as a base track by setting the track_in_movie flag in the corresponding track header box. A base track has a specific sample entry type, for example 'vvs1'. A base track provides either directly in its samples or, by reference to other tracks, the non VCL NALUs. A base track provides reconstruction instructions to build a conforming bit-stream corresponding to an operating point, that is to say a version of a compressed video corresponding to an extracted part of the compressed video or to the full video or to a combination of videos.

When the sample entry type is 'vvs1' (or a dedicated four-character code for VVC base track sample description), the stream to which this sample entry applies shall be, after implicit reconstruction, a compliant VVC stream as viewed by a VVC decoder operating under the configuration (including profile, tier, and level) given in the VVCConfigurationBox of this sample entry. The VVCConfigurationBox is the box providing the information for the decoder configuration (described in a metadata structure called VvcDecoderConfigurationRecord). When the sample entry name is 'vvs1', the default value of array_completeness in the VvcDecoderConfigurationRecord is 0 for all arrays, indicating that additional NAL units of the indicated type may be in the stream. This allows updating the parameter sets along the video sequence. The use of a specific 'vvs1' sample entry type is to allow early signaling through codec parameters of the track type. A variant could also be to derive the track type by inspecting the track reference declared for this track, by checking the presence or not of some specific track reference types (for example, a track reference type indicating implicit reconstruction or dependencies to spatial VVC tracks).

According to some embodiments, a base track does not store any VCL NALU. Instead, it provides, at track level and/or in its sample description, references to the spatial tracks from which media data can be obtained. This may be expressed as a track reference type of type 'vvcd' indicating a dependency to other VVC tracks. This avoids duplicating VCL NALU across displayable tracks, i.e. VCL NALUs are stored in a single place in the file (and described by spatial tracks) and may be referenced by one or more base tracks to reconstruct a version of the compressed video. The reconstruction should lead to a rectangular video.

Still according to some embodiments, a base track may contain, in addition to track reference when present, one or several sample groups providing reconstruction instructions (or reconstruction rules) or dependencies to other tracks as a list of referenced tracks plus a concatenation order for their NALUs. The track reference provides default dependencies or reconstruction rules that can be overridden for some samples via one or more sample groups. The samples that are not mapped to any sample group follow the default reconstruction rules given in the track reference or have the same dependencies as declared in the track reference of the base track. The concatenation order in the sample group allows reconstructing pictures (or portions of pictures) for the considered group of samples mapped in this sample group. For example, a sample group has the grouping_type 'irif' for implicit reconstruction information. The four-character code here is just an example, any reserved four-character code for a sample group describing dynamic (in opposition to a static one for all samples of the track) track references for one or more samples could be used. A more generic sample group has the grouping_type 'dtrf' for dynamic track reference. Samples of base track or samples having a 'vvs1' sample entry may use the sample grouping type 'dtrf' with a grouping_type_parameter of 'vvcd' to provide the list of track dependencies on a group of sample basis instead of for the whole track. For any sample with a sample entry type equal to 'vvs1', the track dependencies or reconstruction instructions shall only point to samples with associated sample entry types equal to 'vvcN' or 'vvcS', i.e. from VVC spatial tracks. Characteristics of such a sample group are detailed hereafter.

Preferably, a base track is independently decodable. A base track may be fragmented or segmented, on the same basis as the spatial tracks it references. A sample in a base track may be marked as a random access sample when all the referenced tracks also contain a random access sample at the same decoding time. With the former, the mechanism can be seen as an activation/deactivation or as an overloading mechanism of some track references along time. The base track may be initialized with the potential maximum list of tracks it may use for reconstruction or it may depend on, for example in a track reference box. This list of tracks or the order between tracks may be updated for some samples in the sample group for dynamic track references. The pre-declaration, for example in a track reference box may be helpful for parsers in their initialization (memory allocation, number of tracks to inspect . . . ) to handle the reconstruction.

Specification of a Sample Group for Implicit Reconstruction or Dynamic Track References A sample group used for overriding the set of track references for one or more samples, for example to describe dynamic implicit reconstruction, has a specific grouping_type, for example 'dtrf' for dynamic track references or 'irif' for implicit reconstruction information (the names and related four-character codes are just examples). A sample group with this specific type consists in a SampleGroupDescriptionBox with this grouping type value and optionally a SampleToGroupBox with this same grouping type value. The SampleGroupDescriptionBox contains one or more specific VisualSampleGroupEntry called, for example, ImplicitReconInfoGroupEntry identified by a specific four-character code 'irif'.

The definition may be as follows:

```
class ImplicitReconInfoGroupEntry extends
VisualSampleGroupEntry('irif') {
    unsigned int ref_count; // number of tracks in use
    unsigned int(32) references[ref_count]; //as given in base track's tref
    box
}
``` where ref_count indicates a number of spatial tracks involved in the reconstruction of the samples of the track containing this sample group and where references [ref_count] is a list of indexes from the track reference box to identify the spatial tracks from where to get VCL NALUs. When ref_count is set to 0, this means that the samples in this group do not follow the default reconstruction rules given by default, for example in the track reference box. The ref_count parameter set to 0 may lead to an empty sample in the base track. The reference parameter gives a reconstruction order that leads to a NALU order compliant with the video encoding format in use (e.g. VVC, HEVC, AVC, etc.). The 'irif' sample group allows describing reconstruction instructions that may change along time. It allows redefining for one or more samples, i.e. a group of samples, the implicit reconstructions that may be declared in the track reference box. It also allows defining reconstruction rules on a fragment or segment basis, whereas current implicit reconstruction rules in NALU File Format defines rules for the whole sequence. It is to be noted that the reference parameter may also indicate a group of tracks, not only a single track, declared as alternative to each other (e.g. when the entry in the track reference box points to a track group identifier with a grouping type indicating alternative tracks, e.g. 'alte' track group type).

Another definition a sample group for dynamic track reference is the following one:

```
class DynamicTrackReference extends VisualSampleGroupEntry('dtrf') {
  unsigned int(8) ref_count;
  [
    unsigned int(8) ref_flags;
    unsigned int(24) ref_index;
  ] (ref_count)
}
``` where ref_count indicates the number of references in the sample group entry and ref_flags indicate a set of flags for this reference. Its meaning depends on the track reference type it overloads and ref_index indicates the index of the reference in the track reference box of this track for the given track reference type as given by grouping_type_parameter of the SampleToGroup box. This sample group is a generalization of the previous one in the sense that it allows overriding a specific track reference type. The track reference type to override shall be indicated in the grouping_type_parameter of the SampleToGroupBox 'sbgp' providing the mapping of samples to a group. The new references to apply are given as index in the track reference box for the given type in the entries of a SampleGroupDescriptionBox with grouping_type set to 'dtrf'. One example of use of the ref_flags is a flag value (0x01) named vvcd_tref_temporal_adjust that indicates that a given reference is to a track with different temporal resolution requiring sample decoding time adjustment during reconstruction. When this flag is set, the reconstruction is modified as follows when no sample can be found in the referenced track: the immediately preceding sample in decoding time is fetched and its data is inserted into the output bitstream. This would allow reconstructing high frame rate tracks from lower frame rate track(s) by duplicating samples from the low frame rate track(s).

For example, when a VVC base track declares dependencies to VVC spatial tracks or to non VCL tracks using a track reference type 'vvcd', the grouping type parameter of the sample to group box with grouping type equal to 'dtrf' is set to 'vvcd'. This means that the sample group overrides the dependency or reconstruction rules given in the track reference for the group of samples mapped into this group. This same mechanism may apply to 'sabt' implicit reconstruction for HEVC tile tracks. The HEVC tile base declares 'sabt' track reference to reconstruct from HEVC tile tracks and a 'dtrf' sample group with a grouping_type_parameter set to 'sabt' would allow changing the reconstruction along time for some samples or group of samples. Another example of track reference overriding may be the coding dependencies, for example indicated by a track reference type 'scal'. In a track having dependencies to one or more other tracks, some samples in this track may be independent from samples in these other tracks. A sample group overriding the 'scal' track reference may signal these samples by declaring them in a sample group with grouping_type='dtrf' and grouping_type_parameter='scal'. A reference count equal to zero is the corresponding sample group description entry indicates no dependencies from samples in other tracks. For this example, when the reference count is not equal to zero, the additional parameter for a sample offset may be useful to indicate dependency to a specific sample in one of the dependent tracks listed in the references[ ] parameter.

While the track reference type 'vvcd' is defined as a track reference that can be dynamic or overridden, existing track reference types are not. To indicate that some track references may be overridden in an encapsulated file, a dedicated brand is defined. When this brand is present in the ftyp, a ttyp, a styp box, or any box inheriting from the GeneralTypeBox, a parser may decide to ignore the file, track, or segment having this brand as a major brand or in its list of compatible brand when this parser does not support dynamic track references. When the parser supports the dynamic track references, it may select for display a track having overridden track references.

As a variant, in the previous examples of sample groups for dynamic track reference or for implicit reconstruction, the references parameters may provide directly a list of track_IDs. This avoids the indirection, at parsing time, through the track reference box. In another variant, the references parameter provides a list of track id or track group id or entity id.

In another variant, the sample group for implicit reconstruction contains an additional parameter for implicit reconstruction in a non-timed aligned manner. The additional parameter provides, for each reference declared in the sample group, a sample offset to the sample to copy in a reference tracks. Applied to the sample group for implicit reconstruction, the new sample group entry is as follows: rewith a sample offset table in 'irif' for non-timed aligned reconstruction

```
class ImplicitReconInfoGroupEntry extends
VisualSampleGroupEntry('irif') {
  unsigned int(16) ref_count; // number of tracks in use
  unsigned int(32) references[ref_count]; //as given in base track's tref box
  unsigned int(32) sample_offset[ref_count];
}
```

In another variant, the sample offset parameter applies to all referenced tracks. It can then be used to build one sample in a base track by shifting time-aligned samples from the referenced tracks.

```
class ImplicitReconInfoGroupEntry extends
VisualSampleGroupEntry('irif') {
  unsigned int(16) ref_count; // number of tracks in use
  unsigned int(32) sample_offset;
  unsigned int(32) references[ref_count];
}
```

In yet another variant for the sample groups for dynamic track the reference or for dynamic implicit reconstruction, the reference count and the reference_list parameters are encoded on a variable number of bits to further reduce the description cost. The number of bits when generating the file is determined by the encapsulation module as the log 2 of the number of tracks declared in the 'moov' box of the encapsulated file. The parser, when processing the encapsulated file also determines the number of bits in use by looking at the number of tracks declared in the 'moov' box of the encapsulated file.

Figure 4:
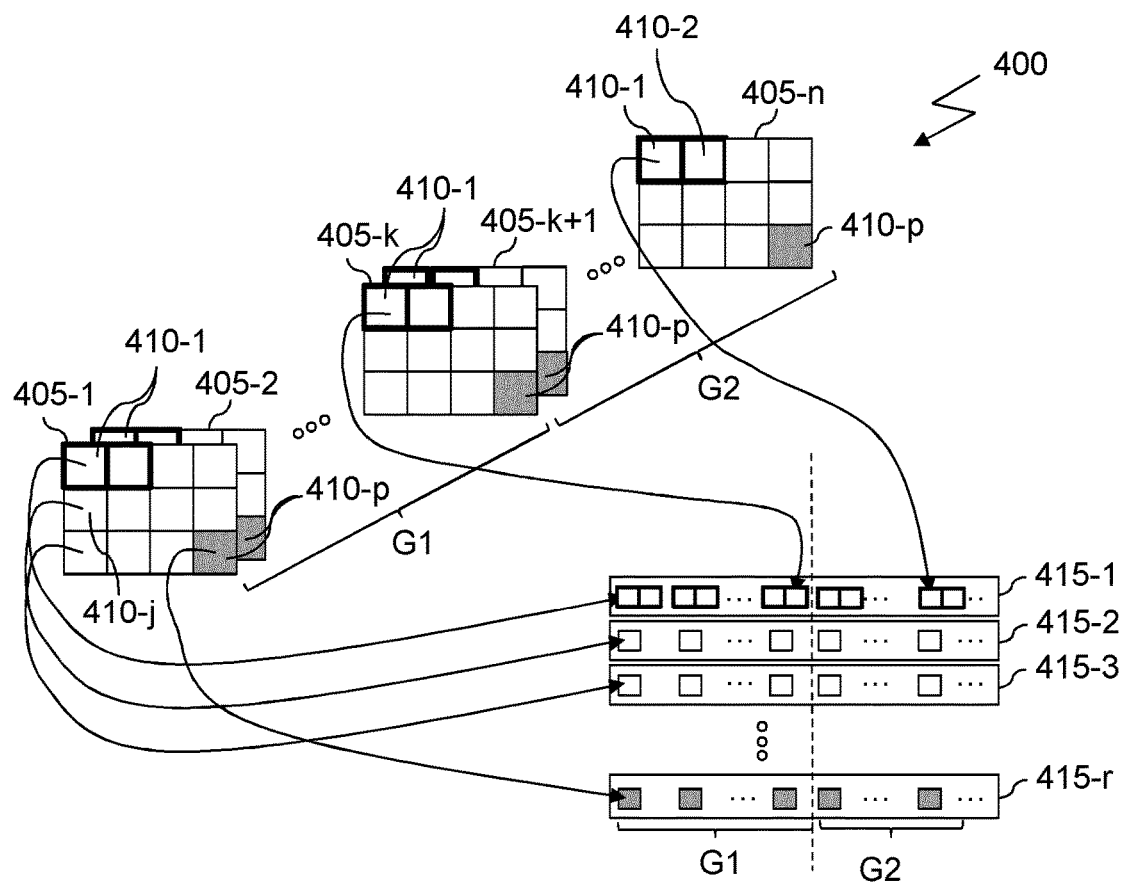
FIG. 4 illustrates an example of using sample groups providing reconstruction instructions.
Figure 4:
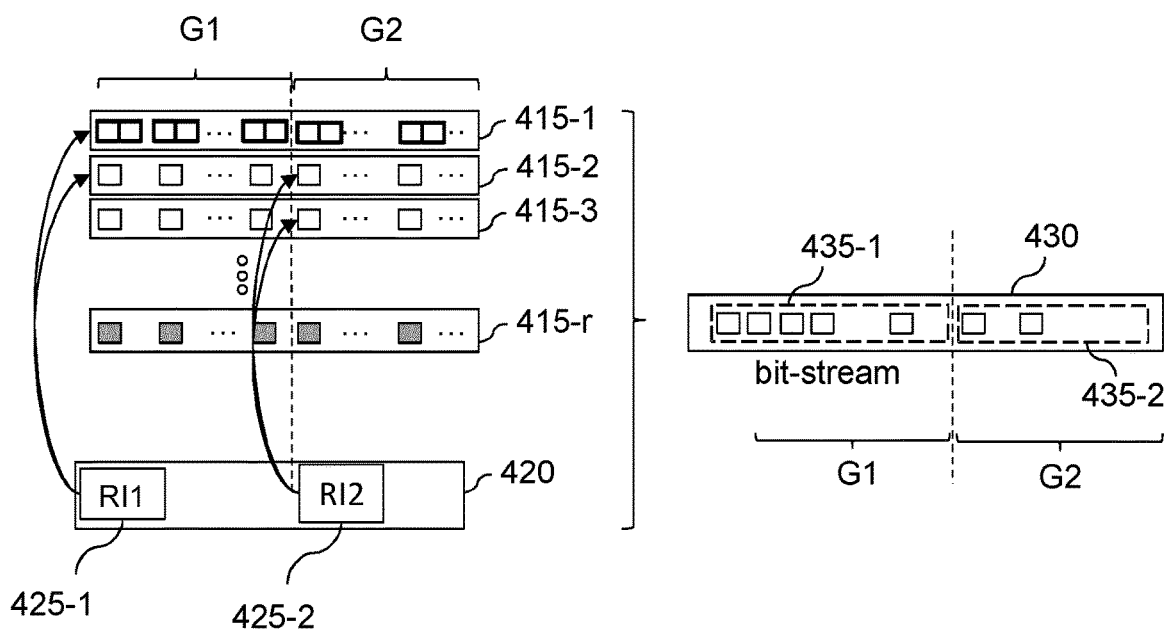

FIG. 4 illustrates an example of using sample groups providing reconstruction instructions.

For the sake of illustration, the video sequence 400 to be encoded and encapsulated comprises a set of frames or pictures (or timed samples), referenced 405-1 to 405-n. The pictures may be grouped into groups (being noted that the pictures of a group may be contiguous or not). For example, pictures 405-1 to 405-k may belong to group G1 and pictures 405-k+1 to 405-n may belong to group G2.

During encoding, each picture is partitioned into rectangular areas, called spatial subsets (or subsamples). Spatial subsets or subsamples may be encapsulated as VVC spatial samples. A VVC spatial sample is a sample described in a VVC spatial track as indicated by the corresponding sample entry type. A VVC spatial sample contains VCL NALU corresponding to a spatial subset at a given decoding time. For example, in VVC, a spatial subset may be a slice (or a set of slices), a tile (or a set of tiles), or a subpicture (or a set of subpictures). A spatial subset may correspond to one or more NAL units. Spatial subsets may be independently encoded or may have temporal dependencies to other spatial subsets. For example, each picture may be partitioned into p spatial subsets (p being an integer number), referenced 410-1 to 410-p.

As described above, spatial tracks may be used to describe samples corresponding to a picture region (i.e. subsamples or VVC spatial samples). A picture region is a rectangular area of a coded picture containing one or more spatial subsets resulting from a picture partitioning (e.g. a picture region may comprise spatial subsets 410-1 and 410-2). A same picture region along the frames of a video sequence is encapsulated as samples in a spatial track. To each picture region in a frame corresponds a sample in a spatial track. For example, the picture region corresponding to spatial subsets 410-1 and 410-2 in the illustrated example is encapsulated in spatial track 415-1. Likewise, the picture region corresponding to spatial subset 410-j may be encapsulated in spatial track 415-2, and so on.

As such, the group of pictures G1 or G2 can be found in the encapsulated spatial tracks as groups of samples, as illustrated.

Using reconstruction instructions stored within a base track, the spatial tracks may be used to reconstruct a bit-stream. For example, base track 420 can be used to reconstruct a bit-stream from media data stored in one, several or all spatial tracks 415-1 to 415-r. In other words, base track 420 is a base track providing reconstruction instructions (RI), referenced 425-1 and 425-2, making it possible to reconstruct a video corresponding to a picture region that is considered of interest. For the sake of illustration, the resulting bit-stream is reconstructed using media data from spatial tracks 415-1 and 415-2 for picture group G1 and using media data from spatial tracks 415-2 and 415-3 for picture group G2. This allows reconstruction of a dynamic picture region, i.e. reconstruction of a conforming VVC bit-stream tracking a moving area in the source video.

Other base tracks providing reconstruction instructions may be defined. In particular, a particular base track may be defined to reconstruct the full picture. In such a case, the base track references all the spatial tracks.

The set of tracks comprising the base track and the needed spatial tracks (i.e. the track 420 and one or more of tracks 415-1 to 415-r), when processed by a parser, leads to a bit-stream such as bit-stream 430 comprising NAL units corresponding to group G1 and NAL units corresponding to group G2. More precisely, the NAL units corresponding to the group of pictures G1 contains concatenated NAL units referenced 435-1, resulting from the concatenation of samples from the tracks referenced by reconstruction instructions 425-1 (i.e. spatial tracks 415-1 and 415-2, corresponding to spatial subsets 410-1, 410-2, and 410-j). Likewise, the NAL units corresponding to the group of pictures G2 contains concatenated NAL units referenced 435-2, resulting from the concatenation of samples from the tracks referenced by reconstruction instructions 425-2.

These groups of samples are declared in the metadata part of the encapsulated file. They may be described using the sample grouping mechanism, e.g. a SampleGroupDescriptionBox and optionally a SampleToGroupBox.

The encapsulation module shall make sure that spatial subsets remain consistent along the video sequence so that a spatial track always describes the same spatial area of a source video, in other words, that it describes the same picture region. For example, if a PPS change in the bitstream modifies the tile configuration, it shall be such that the resulting spatial subsets will include one or more slices, tiles, or subpictures to correspond to the same positions and sizes of the source video. If the tile configuration consists in inserting a tile row or a tile column or both within a tile, then this additional tile row or column or both will be considered as part of the spatial subset containing the initial tile (the spatial subset before insertion contained one tile and contains two tiles after the insertion or both in the case of tile row plus tile column insertion). The same applies to a SPS change and subpictures.

Figure 5:
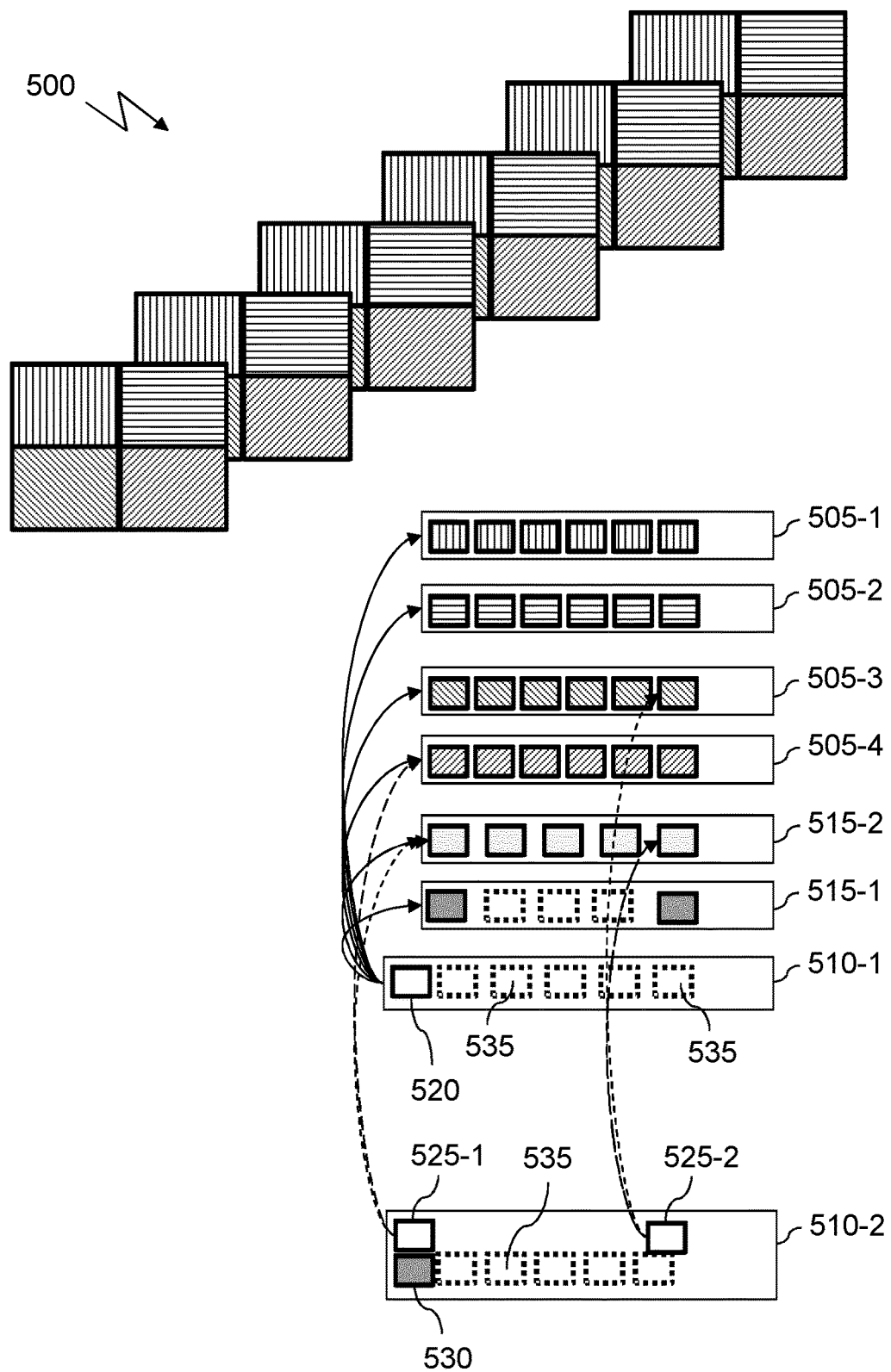
FIG. 5 illustrates another example of using sample groups providing reconstruction instructions, wherein a full video may be reconstructed from a base track, several spatial tracks, and several parameter set tracks.

FIG. 5 illustrates another example of using sample groups providing reconstruction instructions, wherein a full video may be reconstructed from a base track, several spatial tracks, and one or several parameter set tracks.

As illustrated, the video sequence 500 to be encoded and encapsulated comprises a set of frames or pictures. According to this example, the pictures are partitioned into four spatial subsets (represented with four different patterns). Each spatial subset is encapsulated in one of the spatial tracks referenced 505-1 to 505-4.

A base track 510-1 provides reconstruction instructions for the full reconstruction of the full video. According to some embodiments, base track 510-1 contains only metadata, the corresponding payload data being empty since base track's samples are empty (empty samples are represented using rectangles with dashed lines, for example rectangles referenced 535). Indeed, during reconstruction, the reconstructed samples collect non-VCL and VCL NALUs from a set of different tracks referenced in the implicit reconstruction rules referenced 520. According to the illustrated example, implicit rules 520 first references the track referenced 515-1 providing some rather static parameter sets like the DPS, VPS, SPS or PPS or any syntax structure providing syntax elements for a video sequence or a group of pictures. Base track 510-1 also references the track referenced 515-2 (after track 515-1 regarding the order) providing non VCL NALU changing along time like, for example Picture Header or adaptation parameter set (APS) or both, or any syntax structure providing syntax element for a given picture.

Such an encapsulation organization allows mutualizing the data for the subsets defined by the picture partitioning of the video sequence 500. This mutualization is useful when the file contains at least two base tracks. For example, base track 510-1 that is declared for the full reconstruction and a second base track like base track 510-2 that is provided to reconstruct one or more spatial subsets of the video.

From the reconstruction instructions described in base track 510-2, referenced 525-1, it can be seen that base track 510-2 references only track 515-2 for non-VCL NAL units and that it references only spatial track 505-4 for VCL NALU for a picture region of interest. The reconstruction instructions 525-2 also reuses non VCL NALU from track 515-2 and VCL NALUs from another spatial track, here spatial track 505-3. Base track 510-2 also provides its own parameter sets, referenced 530, that are rewritten to describe the video corresponding to the picture region of interest. Thus, not only the spatial tracks may be shared but also track(s) containing non-VCL NALU like APS or Picture Header or any Parameter set that do not need rewriting, like track 515-2. The rewritten parameter sets are preferably included in the base track itself when preparing the reconstruction track in step 265 of FIG. 2.

Figure 6:
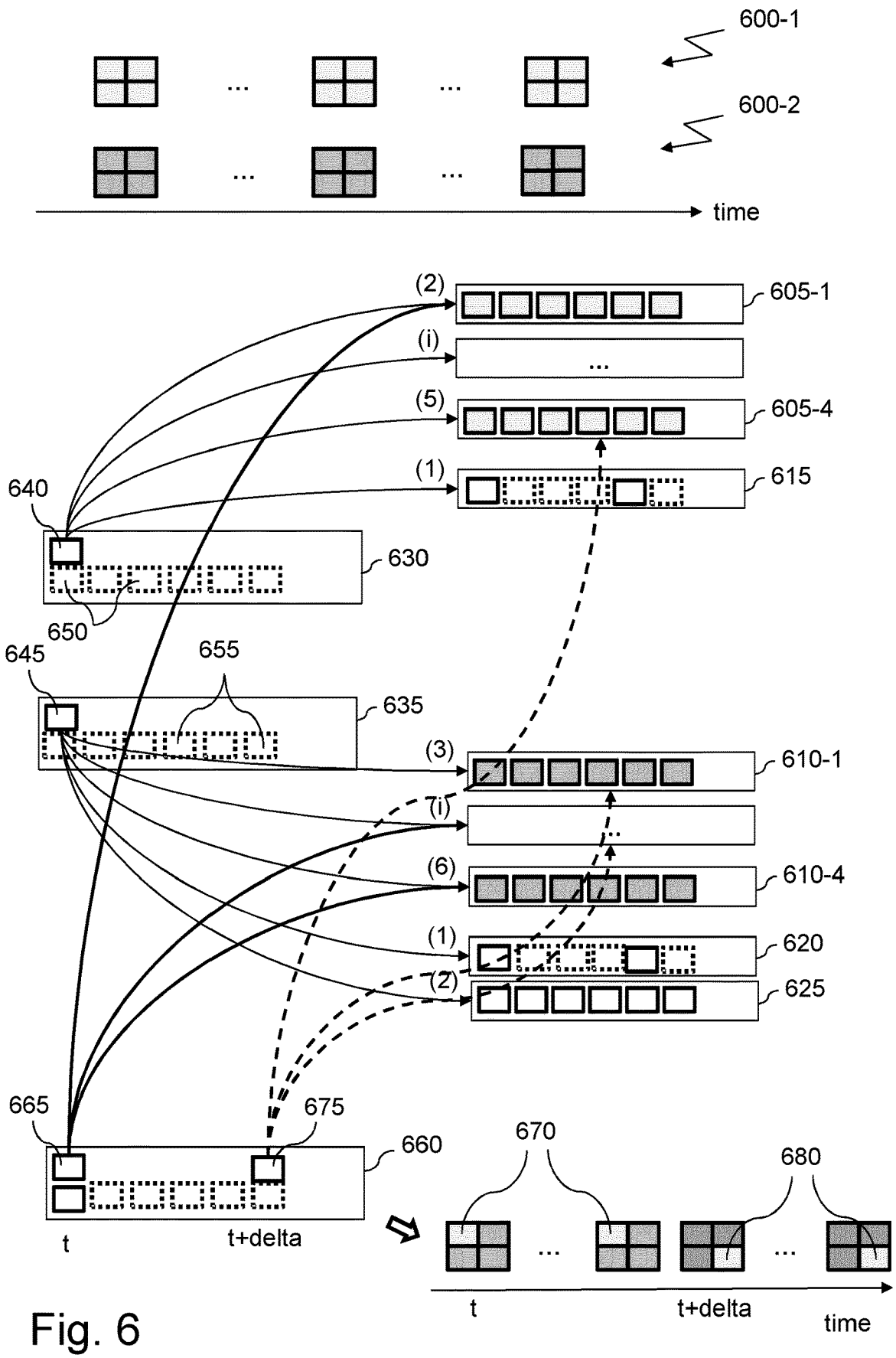
FIG. 6 illustrates another example of using sample groups providing reconstruction instructions, wherein the reconstruction instructions enable spatial swapping.

FIG. 6 illustrates another example of using sample groups providing reconstruction instructions, wherein the reconstruction instructions enable spatial swapping.

According to this example allowing spatial adaptation of videos referred to as spatial swapping, the same source video is encoded into bit-streams at different qualities, for example the two bit-stream 600-1 and 600-2, wherein the encoded pictures are partioned similarly, at least into slices, tiles, or subpictures (lower level partitioning dedicated to compression may differ). For the sake of illustration, the pictures of the bit-stream 600-1 and 600-2 are partitioned into four subsets, as illustrated. To be encapsulated, these bit-streams are provided to an encapsulation module for packaging purposes and eventually preparation for streaming later on.

According to some embodiments, the encapsulation module runs steps such as those described by reference to FIG. 2 to encapsulate each bit-stream into a set of spatial tracks and one or more base tracks.

For the sake of illustration, the spatial subsets of bit-stream 600-1 are encapsulated into spatial tracks 605-1 to 605-4 and the spatial subsets of bit-stream 600-1 are encapsulated into spatial tracks 610-1 to 610-4. Each bit-stream may also be described in one or more parameter set tracks, for example in parameter set tracks 615 and 620, respectively or in a track dedicated to the storage of non VCL NALUs, for example in track 625 or both. It is noted that storing non VCL NALUs in a dedicated track may be advantageous if they can be shared or referenced from more than one base track, to avoid data duplication. Optionally, the non VCL tracks may have a specific sample entry type, for example 'vvcN', providing a minimal set of information as a configuration box, for example a VvcNALUConfigurationBox, describing at least the NALUnitLength in use for the samples of this track. Moreover, this non VCL track may be hidden in the file by not setting the track_in_movie flags in its track header.

According to some embodiments, each subset of each bit-stream is encapsulated into a spatial track. In addition, each spatial track may contain an indication of the version of the encoded video or of the bit-stream it describes. This makes easier the writing of reconstruction instructions, especially for some combinations not planned at encapsulation time. It may also simplify the description of such encapsulated file in a streaming manifest.

When preparing the reconstruction or base tracks, for example when carrying out step 211 in FIG. 2, the encapsulation module may create a base track for each encoded version of the source video like track 630 for bit-stream 600-1 and track 635 for bit-stream 600-2. Base track 630 provides reconstruction instructions referenced 640 for the video sequence compressed into bit-stream 600-1 while track 635 provides reconstruction instructions 645 for the video sequence compressed into bit-stream 600-2. Each set of reconstruction instructions defines the tracks to use, in a specific order as indicated in FIG. 6.

For example, a parser selecting track 630 as a track to be displayed, as described by reference to step 310 in FIG. 3, reconstructs the bit-stream, sample by sample, by concatenating repeatedly a sample from track 615 followed by samples from spatial tracks 605-1 to 605-4. In a similar way, when a parser or player selects track 635, samples would be reconstructed as the concatenation of samples from tracks 620, 625, and 610-1 to 610-4, in this order. When a base track contains samples, the latter are the first in the concatenation.

According to the example illustrated in FIG. 6, base tracks 630 and 635 only have empty samples, like empty samples 650 or 655 (i.e. only contain the metadata part, e.g. sample description boxes, describing the samples but no associated data in the data part of the file, e.g. 'mdat' box).

Another base track referenced 660 may be generated in the encapsulation file to put higher quality on some specific subsets of the video. According to this example, this is described in the reconstruction instructions 665 at the beginning of the base track 660. For example, the quality of the spatial subset located at the top left of the picture (referenced 670) is, at time t, higher than the one of the other spatial subsets of the picture. Later in the track (at time t+delta), new reconstruction instructions referenced 675 are described referencing other spatial tracks, as indicated by dashed arrows. This reconstruction leads to a video wherein, from time t+delta to the end, the quality of the spatial subset located at the bottom right (referenced 680) is higher than the one of the other spatial subsets of the picture.

This kind of encapsulation and "swap" of subsets is easier when the encapsulation module checks the compatibility of the picture headers during the bit-stream analysis. This can be done by checking for pictures having same decoding time whether their corresponding non VCL NALUs are binary equivalent or not. If not binary equivalent, the encapsulation module may parse each parameter in each picture header and compare them one by one to check where are the differences. When the picture headers are equivalent, the encapsulation module may decide to encapsulate these picture headers in a dedicated track, like 625, so that they can be mutualized among the base tracks. When they are not equivalent, the encapsulation module may decide to rewrite the picture header while preparing the description of a reconstruction track, as described by reference to step 265 in FIG. 2. When rewritten, the picture headers are preferably encapsulated as samples of the base track. In this case, when reconstructing a sample for the base track, the base track samples containing the picture header information shall be placed before any sample copied from the tracks referenced in the reference instructions. Spatial tracks sharing the same coding configuration, for example same parameter sets, may be declared in a track selection box as switchable tracks with a differentiating attribute on their bitrate. When a first encapsulation only generates base track for each encoded version (600-1 and 600-2) of a same source video, this information may be useful for subsequent encapsulation creating or storing different entry points for this encapsulated file.

Figure 7:
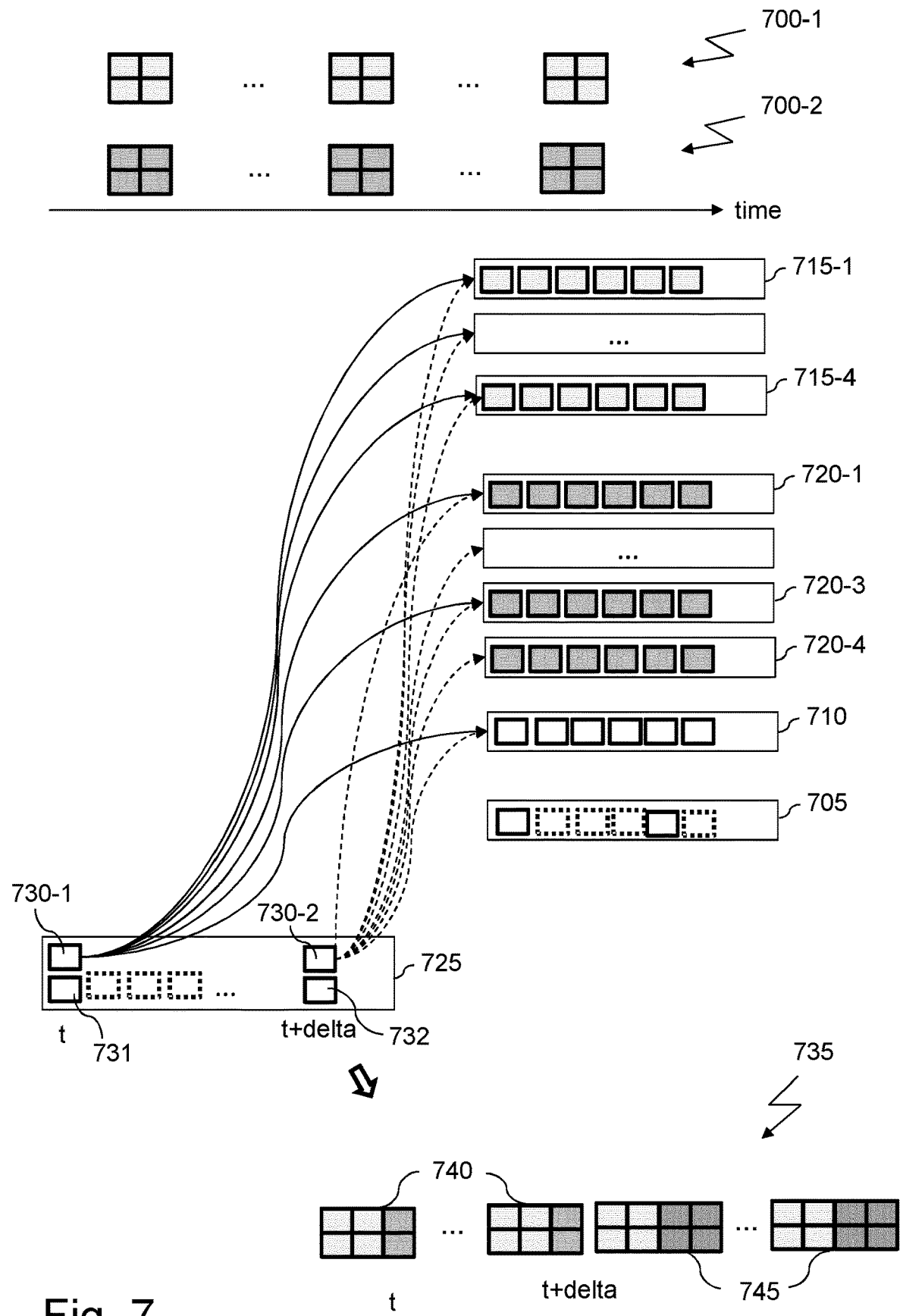
FIG. 7 illustrates another example of using sample groups providing reconstruction instructions, wherein the reconstruction instructions enable picture combination.

FIG. 7 illustrates another example of using sample groups providing reconstruction instructions, wherein the reconstruction instructions enable picture combination.

According to this example, pictures of two bit-streams referenced 700-1 and 700-2 may be combined. For the sake of illustration, it is assumed that the parameter sets and the picture header of these two bit-streams are the same. Bit-streams 700-1 and 700-2 are encapsulated by an encapsulation module of a server. To that end, the encapsulation module analyzes the bit-streams one after the other or in parallel, by parsing independently the different NALUs from each bit-stream, for example as described by reference to FIG. 2.

As illustrated, a track referenced 705 is dedicated to the storage of parameter sets and another track referenced 710 is dedicated to the APS and the picture header. Both tracks 705 and 710 may be marked as non VCL tracks with a dedicated sample entry type like 'vvcN'. Their track header has the track_in_movie flags that is not set because they are not candidate for display.

Each of the spatial subsets of the pictures of bit-streams 700-1 and 700-2 is encapsulated in its own spatial track, with appropriate sample description (at least a sample entry type indicating that samples of these spatial tracks are actually subsamples from bit-streams 700-1 or 700-2). According to the given example, the spatial subsets of bit-stream 700-1 are encapsulated in spatial tracks 715-1 to 715-4 and the spatial subsets of bit-stream 700-2 are encapsulated in spatial tracks 720-1 to 720-4.

The base track referenced 725 defines dependencies or references to all the generated spatial tracks (except for parameter set track 705 since the parameter sets are rewrite its own list of parameter sets) in its track reference box. Some dependencies are declared as possibly overridden along time, for example with a specific track reference type like 'vvcd'.

The encapsulation module generates base track 725 for the concatenation of spatial subsets from the different input bit-streams 700-1 and 700-2. Since the result of the reconstruction is expected to be different from one or the other input bit-stream, the encapsulation module generates new parameter sets describing, in particular, the foreseen sizes of the combination and the spatial layout. According to some embodiments, the encapsulation module generates the "maximal" configuration, i.e. maximum sizes that can be reached by the combination and maximum number of slices, tiles, or subpictures that may be used for spatial access. This can be done by adding the information obtained from the bit-streams analysis, for example during the spatial layout determination as described by reference to step 230 in FIG. 2.

This should be done in order to allocate and declare an appropriate number of tracks because ISOBMFF does not allow adding (or removing) tracks in an encapsulated file.

It is noted that all the references may not be active for all samples because base track 725 uses a sample group for dynamic track reference. Indeed, according to some embodiments, the encapsulation module generates reconstruction instructions using sample groups for dynamic track reference, e.g. like the 'ifif' or the 'dtrf' sample groups. For example, the encapsulation module generates a first sample group referenced 730-1 providing reconstruction instructions for a first group of samples from t to t+delta (excluded) and a second sample group referenced 730-2 providing reconstruction instructions for a second group of samples from t+delta (included) to the end of the sequence.

According to the illustrated example, the first sample group defines reconstruction from all the spatial tracks 715-1 to 715-4 associated with bit-stream 700-1 and from spatial tracks 720-1 and 720-3 corresponding to the left spatial subsets of the pictures of bit-stream 700-2. Still according to the illustrated example, the second sample group defines reconstruction from all the spatial tracks 715-1 to 715-4 associated with bit-stream 700-1 and from all the spatial tracks 720-1 to 720-4 associated with bit-stream 700-2.

According to an embodiment, the first reference in sample group 730-1 is a reference to a non-VCL track containing the picture header, like track 710. This allows mutualizing the picture headers across the different spatial tracks or base tracks. This assumes that the encapsulation module, when writing new parameter sets, does not define a spatial layout based on subpicture identifiers in any picture header.

In the example of base track 725, sample group 730-1 would have a reference count equal to at least 7 (the 6 spatial tracks plus the track for picture header). Their order in the reference list of the sample group 730-1 would be the track for picture header (i.e. track 710 in this example) first, followed by spatial tracks 715-1, 715-2 (not represented), 720-1, 715-3 (not represented), 715-4, and lastly 720-3, where spatial track 720-3 comprises spatial subsets located at the bottom left of the pictures of bit-stream 700-2. The sample group 730-2 would have a reference count equal to at least 9 (the 8 spatial tracks plus the track for picture header). Their order in the reference list described in the sample group 730-2 would be the track for picture header (i.e. track 710 in this example) first, followed by spatial tracks 715-1, 715-2 (not represented), 720-1, 720-2 (not represented), 715-3 (not represented), 715-4, 720-3 and lastly 720-4, where spatial track 720-4 comprises spatial subsets located at the bottom right of the pictures of bit-stream 700-2. This specific order for the referenced spatial tracks follows the rewritten SPS 731 and 732 of the base track 725 defining the spatial layout (e.g. subpictures indexes and optionally subpicture identifiers). In particular, on this example, a new SPS 732 updates the spatial layout for the second part of the sequence.

According to another embodiment, the non VCL NALUs corresponding to picture header are stored directly as samples in base track 725. These non VCL NAL units are then appended as first NALUs, before any NALU from referenced tracks when reconstructing a sample. In such a case, sample group 730-1 may have a reference count equal to at least 6 (6 spatial tracks) and the order of referenced tracks in the reference list of the sample group is spatial tracks 715-1, 715-2 (not represented), 720-1, 715-3 (not represented), 715-4, and lastly 720-3. The resulting encapsulated file, when processed by a parser leads to the bit-stream 735, where the decoded images differ along time as illustrated by the decoded pictures 740 and 745.

Figure 8:
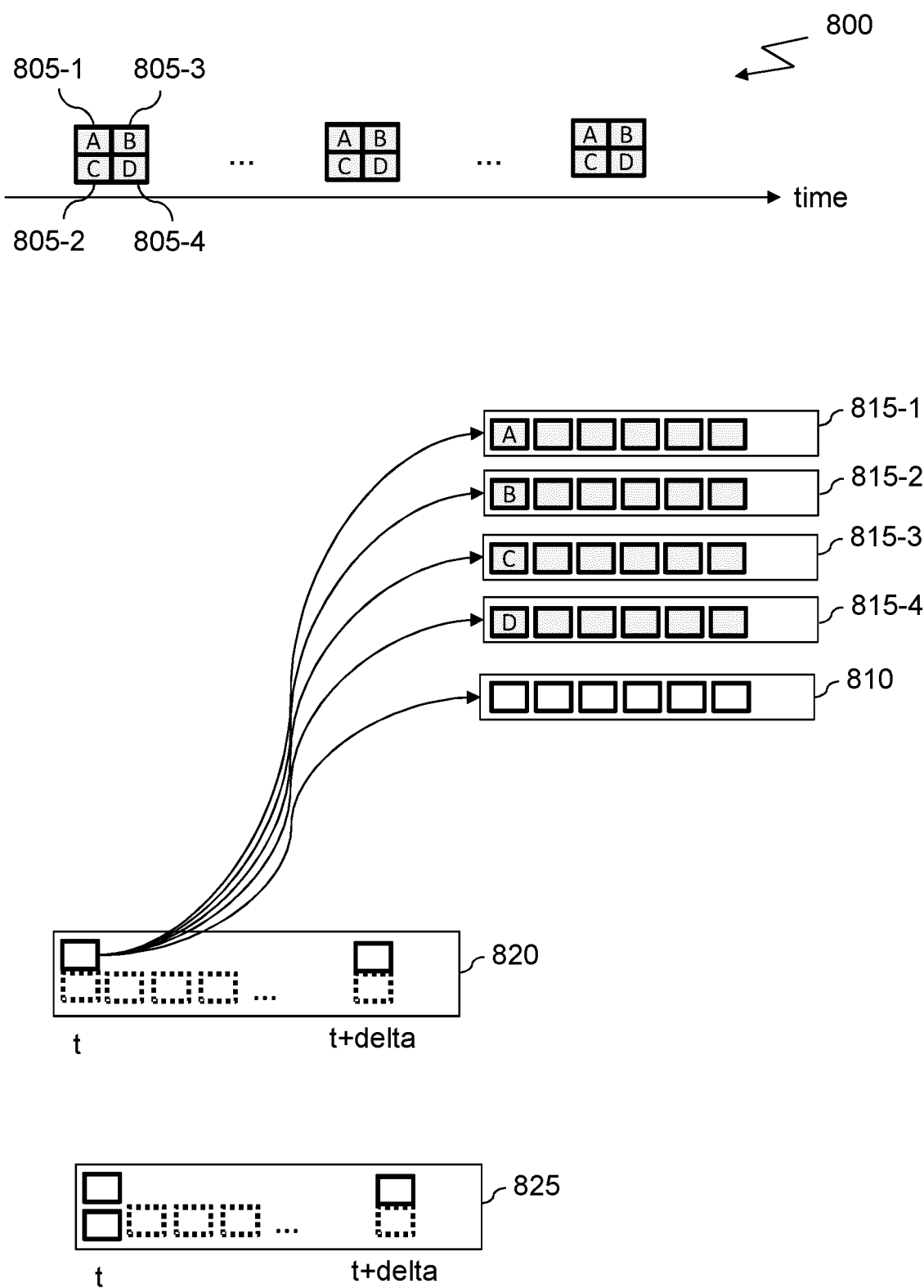
FIG. 8 illustrates another example of using sample groups providing reconstruction instructions enabling reconstruction with a different order than the original one.

FIG. 8 illustrates another example of using sample groups providing reconstruction instructions enabling reconstruction with a different order than the original one.

For the sake of illustration, the bit-stream to be encapsulated, denoted 800, comprises four independent subpictures denoted "A", "B", "C", and "D". It is assumed that bit-stream 800 has been encoded with an SPS declaring the following spatial layout, based on subpictures A, B, C, and D:

subpicture A having index 0, referenced 805-1, starting from (0, 0) and ending at (picture_width/2, picture_height/2);
  subpicture C having index 1, referenced 805-2, starting from (0, picture_height/2) and ending at (picture_width/2, picture_height);
  subpicture B having index 2, referenced 805-3, starting from (picture_width/2, 0) and ending at (picture_width, picture_height/2); and
  subpicture D having index 3, referenced 805-4, starting from (picture_width/2, picture_height/2) and ending at (picture_width, picture_height).

where width and height represent the width and the height of the pictures of bit-stream 800.

The expected order for the bit-stream corresponding to these subpictures is NALUs for subpicture 0 that are followed by NALUs for subpicture 1 that, in turn, are followed by NALUs for subpicture 2, that, finally, are followed by NALUs for subpicture 3. This is because the VVC specification defines the NALU order in bit-stream containing subpictures as a function of the subpicture index.

As illustrated, a track referenced 810 is used to store metadata, in particular the parameter sets (e.g. DPS, VPS, SPS, PPS, APS). Each of the subpictures of the pictures of bit-stream 800 is encapsulated in its own spatial track, with appropriate sample description (at least a sample entry type indicating that samples of these spatial tracks are actually subsamples from bit-stream 800). According to the given example, the subpictures are respectively encapsulated in spatial tracks 815-1 to 815-4.

According to some embodiments, the encapsulation module generates two displayable VVC tracks, also called base tracks, referenced 820 and 825. Base track 820 provides reconstruction based on initial picture order while base track 825 provides another reconstruction order, with a rewritten SPS. Indeed, according to this example, the encapsulation module changes the SPS to allow line-based decoding, targeting specific decoder implementations, for example with limited buffering (e.g. one or limited number of CTU rows) and for low-delay decoding.

While the initial Parameter Sets, available in track 810 and used by base track 820, described subpictures in the A, C, B, and D order, base track 825 declares a new subpicture layout with the following subpicture indexes:

subpicture A having index 0 (805-1), starting from (0, 0) and ending at (picture_width/2, picture_height/2);
subpicture B having index 1 (805-3), starting from (picture_width/2, 0) and ending at (picture_width, picture_height/2);
subpicture C having index 2 (805-2), starting from (0, picture_height/2) and ending at (picture_width/2, picture_height); and
subpicture D having index 3 (805-4), starting from (picture_width/2, picture_height/2) and ending at (picture_width).

The encapsulation module provides the reconstruction instructions considering the compliant NALU order given the rewritten SPS. The sample group for dynamic implicit reconstruction then references the four subpicture tracks in the following order: 805-1, 805-3, 805-2, and 805-4. The dynamic implicit reconstruction shall be consistent with the spatial layout described in the bit-stream, either the original one or a bit-stream resulting from an extraction, reconstruction, or merging of one or more bit-streams. This is handled by the encapsulation module so that the parsing is unambiguous once a displayable track is selected.

In some embodiments, the dynamic track reference applies to metadata track describing media track. For example, the media track may be a video track onto which objects of interest are tracked. The associated metadata track, via a track reference type 'cdsc' to the video track in its track reference box, may provide annotations for the tracked objects. These annotations may be textual description entered by a user or may be textual annotations generated by an image analysis module. There may be multiple tracked objects moving onto the video. While the track reference associates at track level the metadata track to the video track, a sample group for dynamic track reference, indicated by a specific grouping type like 'dtrf' may refine this association. For example, the video is encoded into a VVC bit-stream with a set of independent subpictures. Each subpicture is encapsulated into a VVC spatial track. The metadata track is by default associated with each of these spatial tracks, since annotations may describe an object on any of these subpictures.

The dynamic track reference allows refining, along the video sequence, the association to one or more specific subpictures with which the annotations apply. The sample group of type 'dtrf' then has its grouping_type_parameter set to 'cdsc' to indicate that it refines the 'cdsc' relationship between the metadata track and some other tracks in the file. The sample group for dynamic track reference then provides a reference count for a group of samples indicating the number of tracks described by a group of samples of the metadata track. Metadata sample may provide a list of annotations. The references[ ] parameter in the sample group indicates which annotation applies to which track, a VVC spatial track in our example. When no object of interest is detected for a given time range, the sample group for dynamic track reference including samples for this time range has a ref_count set to 0. When one object of interest is detected into one subpicture on another time range, this sample group has a ref_count set to 1 and the references[ ] parameter provides the index in the track reference corresponding to the 'cdsc' to the VVS spatial track encapsulating this subpicture. When on another time range, the object moves to another subpicture, a new sample group with same time but new group of samples, corresponding to this another time range, provides the reference to the VVC spatial track describing this subpicture. It is to be noted that this extension of the content description track reference 'cdsc' may apply to other media tracks, not only spatial ones.

Accordingly, an aspect of the invention is to provide method for encapsulating partitioned timed media data in a server, the partitioned timed media data comprising a plurality of timed samples, each timed sample comprising a plurality of subsamples, the timed samples being grouped into a plurality of groups, the method comprising:

obtaining a plurality of spatial tracks, each spatial track comprising at least one subsample of a first timed sample and one corresponding subsample of each of the timed samples of the plurality of timed samples different from the first timed sample, each of the corresponding subsamples being located at the same spatial position in its own timed sample as the at least one subsample in the first timed sample;
creating an additional track referencing at least some of the spatial tracks, the additional track comprising items of information related to a link between spatial tracks, for example regarding object representations encoded within these spatial tracks; and
independently encapsulating each of the tracks in a least one media file.

It is noted that while the examples described above are directed to groups of consecutive samples, the invention also applies on sample groups corresponding to repetitive sample patterns (e.g. every two samples or random samples) and to any sample grouping that can be described by the SampleToGroupBox and the ISOBMFF sample grouping mechanism.

Figure 9:
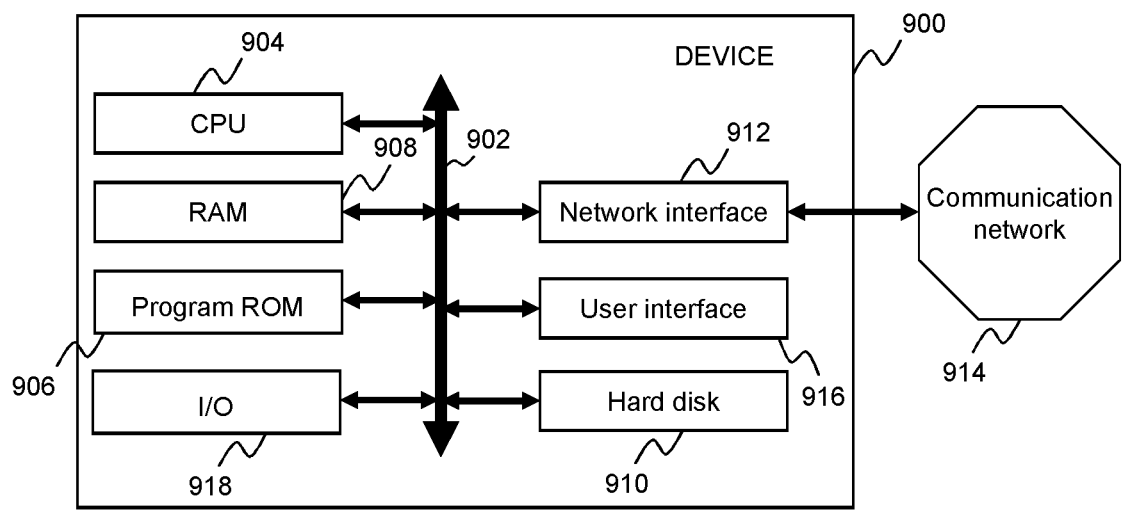
FIG. 9 schematically illustrates a processing device configured to implement at least one embodiment of the present invention.

FIG. 9 is a schematic block diagram of a computing device 900 for implementation of one or more embodiments of the invention. The computing device 900 may be a device such as a micro-computer, a workstation or a light portable device. The computing device 900 comprises a communication bus 902 connected to:

a central processing unit (CPU) 904, such as a microprocessor;

a random access memory (RAM) 908 for storing the executable code of the method of embodiments of the invention as well as the registers adapted to record variables and parameters necessary for implementing the method for requesting, de-encapsulating, and/or decoding data, the memory capacity thereof can be expanded by an optional RAM connected to an expansion port for example;

a read only memory (ROM) 906 for storing computer programs for implementing embodiments of the invention;

a network interface 912 that is, in turn, typically connected to a communication network 914 over which digital data to be processed are transmitted or received. The network interface 912 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 904;

a user interface (UI) 916 for receiving inputs from a user or to display information to a user;

a hard disk (HD) 910;

an I/O module 918 for receiving/sending data from/to external devices such as a video source or display.

The executable code may be stored either in read only memory 906, on the hard disk 910 or on a removable digital medium for example such as a disk. According to a variant, the executable code of the programs can be received by means of a communication network, via the network interface 912, in order to be stored in one of the storage means of the communication device 900, such as the hard disk 910, before being executed.

The central processing unit 904 is adapted to control and direct the execution of the instructions or portions of software code of the program or programs according to embodiments of the invention, which instructions are stored in one of the aforementioned storage means. After powering on, the CPU 904 is capable of executing instructions from main RAM memory 908 relating to a software application after those instructions have been loaded from the program ROM 906 or the hard-disc (HD) 910 for example. Such a software application, when executed by the CPU 904, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encapsulating partitioned video data in at least one media file, the partitioned video data comprising a plurality of samples, each sample comprising a plurality of partitions, the frames samples being grouped into a plurality of groups, the method comprising:

obtaining a plurality of spatial tracks, each spatial track comprising at least one partition of a first sample and one corresponding partition of each of the samples of the plurality of samples different from the first sample, each of the corresponding partitions being located at the same spatial position in its own sample as the at least one partition in the first sample;

creating a base track referencing at least some of the spatial tracks, the base track comprising a plurality of reconstruction instructions, each of the reconstruction instructions being associated with a group of samples and each of the reconstruction instructions enabling generating a portion of a bit-stream from partitions of spatial tracks that belong to a same group of samples; and encapsulating each of the tracks in a least one media file.

2. The method of claim 1, wherein each of the reconstruction instructions corresponds to an ordered list of spatial track references.

3. The method of claim 1, wherein the reconstruction instructions belong to the metadata part of the base track.

4. The method of claim 1, further comprising generating the plurality of spatial tracks.

5. The method of claim 4, wherein generating the plurality of spatial tracks comprises:

selecting partitions from amongst the plurality of partitions of one of the samples; and for each of the selected partitions, creating one spatial track comprising the selected partition and corresponding partitions being located at the same spatial position in its own sample as the selected partition.

6. The method of claim 4, further comprising determining a layout of partitions within a sample.

7. The method of claim 4, further comprising determining an encapsulation layout, the plurality of spatial tracks being generated as a function of the encapsulation layout.

8. The method of claim 1, wherein the reconstruction instructions comprise an ordered list of references to spatial tracks.

9. The method of claim 1, wherein reconstruction instructions associated with a group of samples make it possible to modify reconstruction instructions associated with another group of samples.

10. The method of claim 1, wherein the portions of bit-stream conform the MPEG Versatile Video Coding standard.

11. The method of claim 2, wherein the ordered list indicates the decoding order of the partitions of the spatial tracks.

12. The method of claim 8, wherein the ordered list informs about the decoding order of the partitions of the spatial tracks.

13. A non-transitory computer-readable storage medium storing instructions of a computer program for implementing each of the steps of the method according to claim 1.

14. A method for processing at least one media file including encapsulated partitioned video data, the partitioned video data comprising a plurality of samples, each sample comprising a plurality of partitions, the samples being grouped into a plurality of groups, the method comprising:

obtaining at least one media file comprising at least one base track and a plurality of spatial tracks, each spatial track comprising at least one partition of a first sample and one corresponding partition of each of the samples of the plurality of samples different from the first sample, each of the corresponding partitions being located at the same spatial position in its own sample as the at least one partition in the first sample;

the base track referencing at least some of the spatial tracks, the base track comprising a plurality of reconstruction instructions, each of the reconstruction instructions being associated with a group of samples and each of the reconstruction instructions enabling generating a portion of a bit-stream from partitions of spatial tracks that belong to a same group of samples;

for each of the plurality of groups of samples, generating a portion of a bit-stream according to reconstruction instructions associated with each of the plurality of groups of samples.

15. The method of claim 14, further comprising obtaining media data from spatial tracks and concatenating the obtained media data according to an order defined by reconstruction instructions.

16. The method of claim 15, further comprising obtaining metadata and concatenating the obtained metadata with the media data, wherein the metadata are obtained from the base track or from an additional track.

17. A device for processing at least one media file including encapsulated partitioned video data, the device comprising:

a processing unit configured for carrying out each of the steps of the method according to claim 14.

18. A device for encapsulating partitioned video data, the device comprising:

a processing unit configured for configured for carrying out a method for encapsulating partitioned video data in at least one media file, the partitioned video data comprising a plurality of samples, each sample comprising a plurality of partitions, the samples being grouped into a plurality of groups, the method comprising:

obtaining a plurality of spatial tracks, each spatial track comprising at least one partition of a first sample and one corresponding partition of each of the samples of the plurality of samples different from the first sample, each of the corresponding partitions being located at the same spatial position in its own sample as the at least one partition in the first sample;

creating a base track referencing at least some of the spatial tracks, the base track comprising a plurality of reconstruction instructions, each of the reconstruction instructions being associated with a group of samples and each of the reconstruction instructions enabling generating a portion of a bit-stream from partitions of spatial tracks that belong to a same group of samples; and encapsulating each of the tracks in a least one media file.

* * * * *